Figure 1:
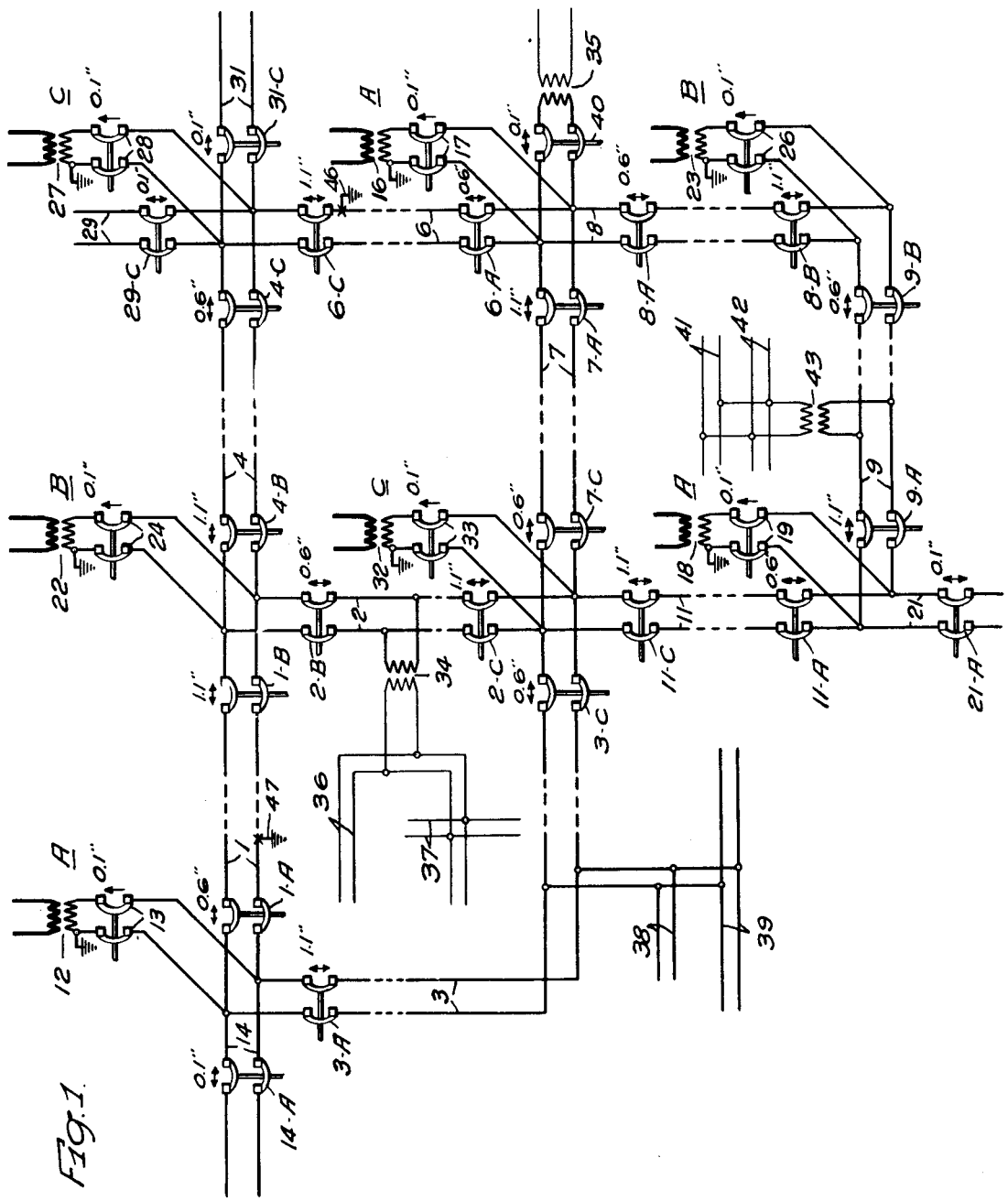

April 17, 1934.  J. S. PARSONS  1,955,311
ALTERNATING CURRENT NETWORK SYSTEM OF DISTRIBUTION
Filed March 10, 1931   3 Sheets-Sheet 1

WITNESSES.
Leon J. Vaza
M. Davidson

INVENTOR
John S. Parsons.
BY
Cherley G. Carr
ATTORNEY

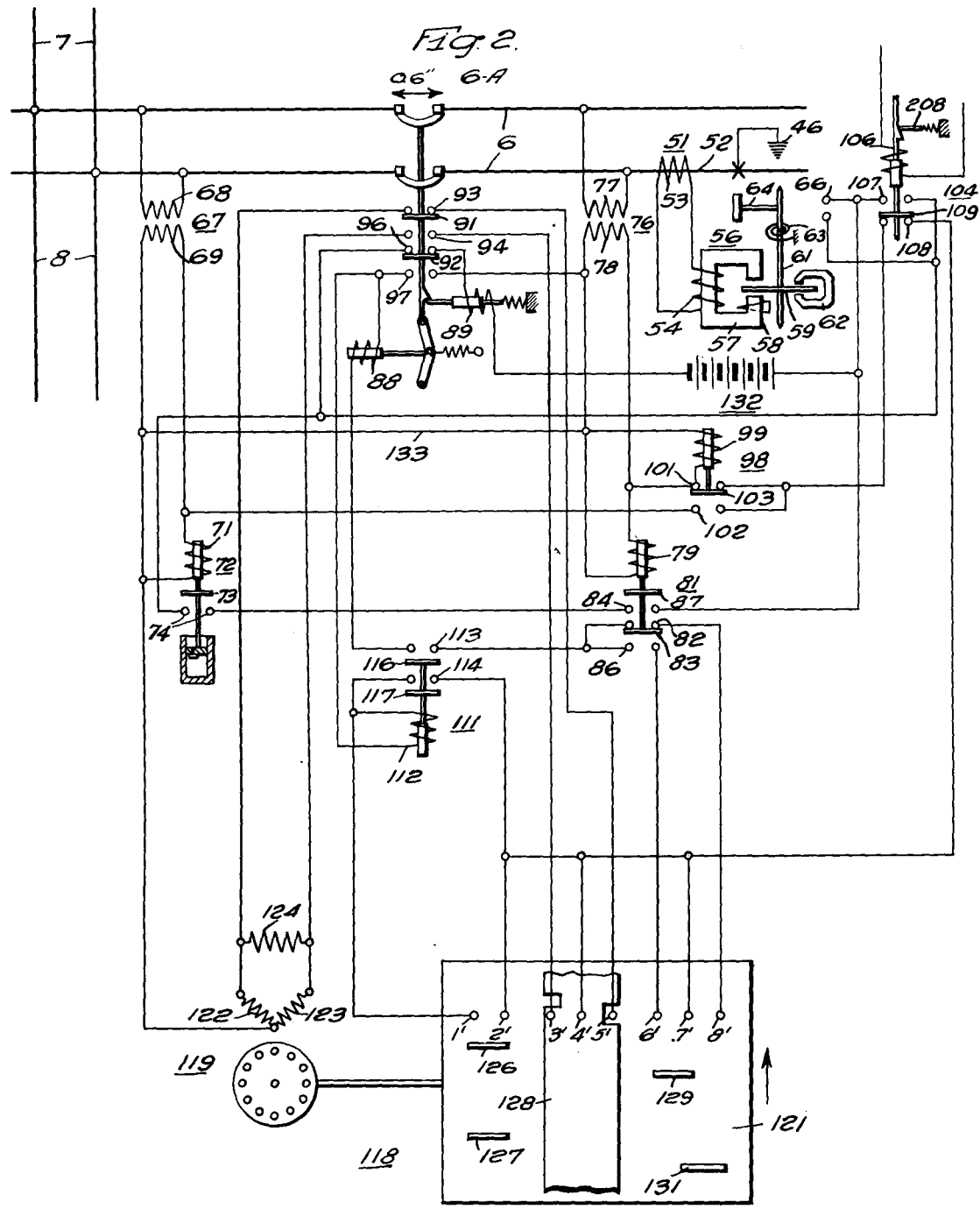

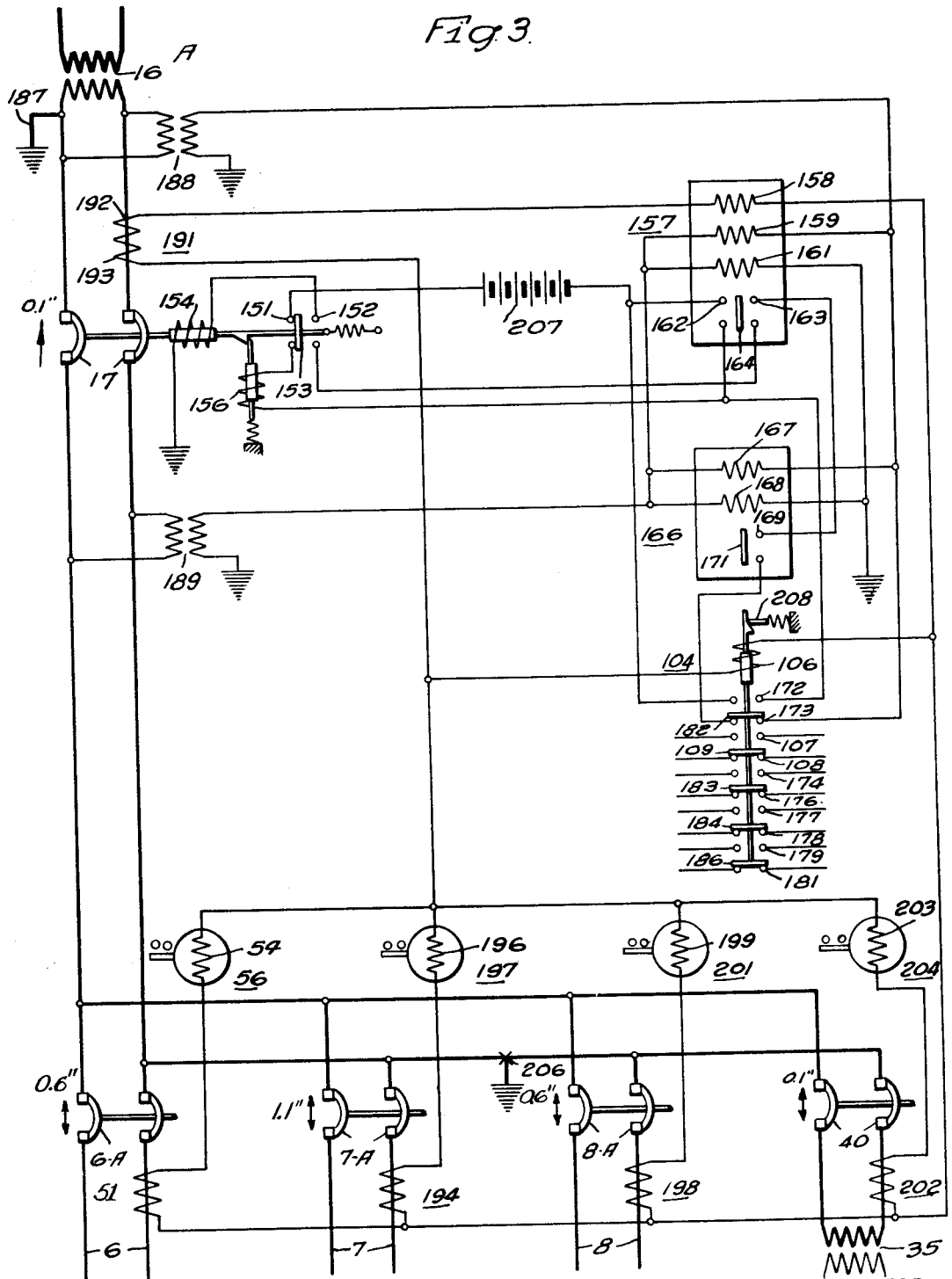

Patented Apr. 17, 1934

1,955,311

UNITED STATES PATENT OFFICE 1,955,311

ALTERNATING CURRENT NETWORK SYSTEM OF DISTRIBUTION

John S. Parsons, Swissvale, Pa., assignor to Westinghouse Electric & Manufacturing Company, a corporation of Pennsylvania Application March 10, 1931, Serial No. 521,491

16 Claims. (Cl. 175—294)

The present invention relates to a medium-voltage-primary alternating current network system of distribution, and a protective relay scheme therefor.

In the supply of power to a load or consumer, several problems present themselves in the selection of a proper distribution system. In densely loaded areas, such as are present in large metropolitan cities, the distribution system is usually of the low-voltage secondary-network type, wherein the feeder voltage is supplied directly to the network distribution transformers from the generating station or stations with no intermediate transformation steps.

In this type of distribution system, a plurality of feeders, energized from different sources, may be synchronized through the secondary-network load, and proper relay protective means are associated with each feeder for effecting the disconnection thereof in the event of a predetermined magnitude of power flow from the network to the feeder. All faults occurring in the secondary network are permitted to burn clear, and any suitable fuse protection may be provided for protecting the load apparatus.

In the low-voltage secondary-network type of distribution, the feeders supplying power to the network may be of different kv. and kva. ratings, and the interconnection of the plurality of generating sources through the network secondary ensures a maximum continuity of service to the consumer.

A second type of alternating-current distribution system may be referred to as a radial-distribution system wherein the generator or transmission voltage is first transformed to distribution voltage, and the distribution voltage again transformed to the proper utilization value of 220 or 110 volts. The distribution voltage is usually limited to about 4 kv., since the radial feeders may not be worked upon with any degree of safety for much higher voltage values.

Briefly, a typical radial distribution system includes the transmission feeder connecting the source of supply to a substation, distribution feeders emanating from the substation, and load-supply mains radiating from the terminus of each distribution feeder; each distribution feeder terminating at the approximate load center of the area to be supplied thereby.

The radial system of distribution is used extensively in localities where the load density is not high enough to warrant the installation of the low-voltage secondary type of network, and in view of the many advantages which may be obtained by substituting a medium-voltage primary network for the existing radial systems, the importance of the proposed system is substantial.

In the drawings:

Figure 1 is a schematic diagram of a primary network of the type contemplated in the present invention, Fig. 2 is a schematic diagram of the relay-protective means associated with one of the network feeder circuit breakers, and Fig. 3 is a schematic diagram of the control means for a primary network transformer including relay means responsive to faults at a typical intersection in the primary network.

Referring more particularly to Fig. 1, the medium-voltage primary network comprises a mesh or grid of interconnected distribution feeders 1, 2, 3, 4, 6, 7, 8, 9 and 11, which are supplied with power from a plurality of different feeder sources A, B and C. The several sources A, B and C may be supplied from suitable generating stations, and the voltage thereof may be assumed, for example, to be of the order of 13,000 and/or 22,000 volts.

Distribution transformers are associated with the feeder sources and the high voltage is transformed to any suitable distribution voltage, such as 4,000 or 2,300 volts. A distribution transformer 12 is connected for energization from the source A, and is connected to the connection point of the feeders 1 and 3 through a suitable circuit breaker 13. A radial feeder 14 is also shown as energized from the source A through the distribution transformer 12 and is adapted to supply an outlying small load district. A second distribution transformer 16 is energized from the same source A, and is connected to the connection point of the feeders 6, 7 and 8 through a suitable circuit breaker 17. A third distribution transformer 18 is also energized from the source A and the secondary thereof is connected to the connection point of the feeders 9 and 11 through a circuit breaker 19. A radial feeder 21 is also energized from this distribution transformer and is adapted to supply any suitable load area.

The voltage of the source B is adapted to be transformed to the network voltage by means of distribution transformers 22 and 23, and the respective secondaries of these transformers are connected to the interconnection points of the feeders 1, 2, 4 and 8, 9, respectively, through suitable circuit breakers 24 and 26, respectively.

The third source C is connected to a distribution transformer 27, and the secondary thereof is connected to the connection point of feeders 4 and 6 through a suitable circuit breaker 28.

Radial feeders 29 and 31 are also connected to this connection point and are adapted to supply energy to relatively isolated low-load-density districts. Another or the same transmission feeder energized from the source C is connected to a distribution transformer 32, and the secondary thereof is connected to the connection point of the feeders 2, 3, 7 and 11 through circuit breaker 33.

It will be noted that the primary network, comprising the respective feeders 1, 2, 3, 4, 6, 7, 8, 9 and 11, is energized from the three separate sources A, B and C through proper transforming means, and that the primary network is supplied from each of the sources at one or more connection points of the feeders in the primary network.

As referred to hereinbefore, the voltage of the respective feeders in the primary network may be of the order of 4,000 volts, and such distribution feeders may be of either overhead or underground construction, depending upon the desired characteristics of any particular system and the limitations imposed thereon. As indicated with reference to the network distribution feeder 2, a step-down distribution transformer, such as transformer 34, may be provided for supplying power to the loads or consumers at any desired secondary voltage, such as 220 or 110 volts. The secondary of the step-down transformer 34 is indicated as supplying a desired utilization voltage to suitable secondary mains, as indicated by 36 and 37.

Primary laterals 38 and 39 are connected to the feeder 3 and are adapted to supply power to any loads which do not require a higher grade of service. Step-down transformers corresponding to the transformer 34 in feeder 2 are to be understood as being associated with these primary laterals for the supply of power to a load or consumer.

Secondary laterals 41 and 42 may also be provided and are indicated as being energized from the feeder 9 through a suitable step-down transformer 43.

In cases where a high grade of service is required, it may be supplied from the nearest intersection or connection point. For instance, assume that there is a demand for high-grade service near the intersection or connection point of feeders 6, 7 and 8. The distribution transformer 35 for supplying this load may be connected to the intersection or connection point through circuit breaker 40, as shown. This circuit breaker is controlled just as are the breakers associated with the radial feeders such as feeder 14. It is obvious that the supply source is much more reliable when transformer 35 is connected to the intersection, as shown, than would be the case if it were connected to feeder 6, 7 or 8. If the distribution transformer 35 were connected to feeder 8, a fault on the feeder would result in an interruption to the service; whereas if the transformer is connected to the intersection point inside the breakers, a fault may occur on any of the three feeders 6, 7 or 8, without interruption of the service. This, of course, represents an exceptional case, and the majority of customers will be supplied from the network feeders, such as feeder 2, through distribution transformers, such as transformer 34.

The primary network illustrated in Fig. 1 may be considered as a typical network of the medium-voltage type and the various usual distribution feeder and secondary load arrangements are to be understood as being indicative of possible system connections.

The various loads are supplied by the respective feeders as indicated by the secondary transformer arrangements associated with the feeders 2 and 9. Since any faults occurring in the secondary or load circuits may be allowed to clear themselves without resorting to complicated relay apparatus, no circuit breakers are indicated between the transformers 34 and 43 and their respective energizing feeders 2 and 9. Fuses may be used in either the primaries or secondaries of both of these distribution transformers.

However, proper protective equipment must be provided for effecting the isolation of faulty feeders, or upon the occurrence of a fault at any one of the intersection points. It is also necessary to effect the isolation of any primary network transformer upon the occurrence of a fault on one of the source feeders, or upon the deenergization of the particular supply source.

The present invention provides a satisfactory protective system for such primary alternating-current network and such system is particularly advantageous in that it incorporates simplicity in design and application, reliability in service, relatively low installation and maintenance expense, and also allows for extension and modification of the network system without other than minor changes in the relays or settings.

It is an object of the present invention to provide a complete protective system for a medium voltage primary network.

Another object of the present invention is to determine the nature of fault conditions occurring in a medium voltage primary network and to provide complete protection therefor.

Another object of the present invention is to provide a protective system for a medium voltage primary network, such that no limitations are placed on the extension of the network.

Another object of the present invention is to provide a protective system for an alternating current primary network, such that overcurrent relays having different definite time delay characteristics are utilized to effect the actuation of the primary network circuit breakers.

A further object of the present invention is to provide a protective system for an alternating current primary network, said system embodying means responsive to network transformer faults, network feeder faults and intersection faults.

Some of the more obvious advantages of a medium voltage primary network over a radial system are clearly apparent. It will be noted that the primary network system does not require circuit breakers in the high voltage transmission feeders. There is no necessity for providing substations with the attendant disadvantage, as present in the radial system, of increasing the number of substations or relocating those already in existence in the event of increased load demand in some sections of the system. Other advantages of the medium voltage primary network over the radial system will become apparent from the detailed description of the present invention.

Since all of the interconnected feeders in the primary network must be protected upon the occurrence of fault conditions, suitable circuit breakers are provided at the respective ends of each feeder, and the protective apparatus is made operable to isolate any faulty feeder by opening its circuit breakers in the event that the fault condition persists for a predetermined time.

The satisfactory operation of the primary network is not made to depend upon the magnitude and distribution of fault current in the system, and the protective apparatus does not function primarily to provide time selectivity between the several breakers, although such selectivity is inherent in the operation of the protective arrangement.

Inasmuch as it is possible that one or more of the sources A, B or C may be out of service during some system-operating conditions, the distribution transformers, associated with the respective sources, must be adapted to carry more than the normal load. In the event that any sources are out of service, the primary feeders will also be required to carry more than the normal load; the magnitude thereof depending upon the particular system application.

Assuming that it is permissible for a load of about 150% normal to exist on the network transformers in case of emergency, the respective network feeders are provided with over-current relays which are given a current setting equal to about 150% or 200% normal load on one of the network transformers. The current settings of the relays may be made somewhat lower than the value mentioned above, providing they are made high enough to prevent tripping of the breakers on overloads to which the network feeders will be subjected. A definite time setting is imparted to each relay, the time delay depending upon the location of the relay in the system, and the character of the system.

The circuit breakers for the respective feeder circuits and the radial feeders, shown in Fig. 1, are indicated in closed position, and it is assumed that all of the sources A, B and C are energized and supplying power to the primary network through their respective network transformers.

It will be noticed that the source A supplies power through the distribution transformer 12 to a connection point of the network feeder circuits 1 and 3 and the radial feeder 14. At this intersection point, the primary network feeder circuits 1 and 3 are provided with suitable circuit breakers 1—A and 3—A, while the radial feeder circuit is provided with a circuit breaker 14—A. The respective network-feeder circuit breakers and the radial-feeder circuit breaker are located in proximity to the circuit breaker 13 and the distribution transformer 12. Therefore, all of these circuit breakers and the distribution transformer may be located in a single vault or cubicle, and the relay apparatus associated with each circuit breaker may be included in the same vault.

In a similar manner, the circuit breaker 1—B at the other end of the feeder circuit 1 is housed in a vault with the circuit breaker 24 and network transformer 22 of the source B, the circuit breaker 4—B at one end of the network feeder circuit 4 and the circuit breaker 2—B at one end of the network feeder 2.

A circuit breaker 4—C is provided at the other end of the primary network feeder 4, and is adapted to be housed in the same vault with the circuit breaker 28 and network transformer 27 of the source C, circuit breaker 29—C at one end of the radial feeder 29, circuit breaker 31—C at one end of the radial feeder 31 and circuit breaker 6—C at one end of the network feeder 6.

The circuit breakers at the remaining intersection or connection points of the respective primary network feeder circuits, radial feeders and the network transformers from the respective sources A, B or C, are housed in the same vault or receptacle with their associated network transformer. Each of the circuit breakers associated with the primary network feeder circuits have been indicated by a combination reference character of the feeder circuit and the supply source denoting the particular feeder circuit and the connected source. The same mode of indication is also utilized with reference to the circuit breakers in the respective radial feeders.

In accordance with the present invention, half of the overcurrent relays associated with the primary network feeder circuits, which are normally fed from both ends, are set to close their tripping contacts after about 0.6 second definite time-delay, and the other half are set for approximately 1.1 seconds time delay.

The time delay of operation of the overcurrent relay associated with each circuit breaker in the network system shown in Fig. 1, is indicated on the drawings, and, inasmuch as the overcurrent relay is responsive to a predetermined value of current flowing in either direction, indicating arrows beside each circuit breaker, having a double arrowhead, are utilized.

Since it is necessary to alternate the time settings of the relays in the network system, it will be assumed that the circuit breaker 1—A is controlled by an overcurrent relay having a definite time setting of 0.6 second, and that the time setting of the relay associated with the circuit breaker 1—B has a time setting of 1.1 seconds. It follows, therefore, that the circuit breaker 2—B must be controlled by an overcurrent relay which has a definite time setting of 0.6 second, and also that the circuit breaker 2—C is controlled by an overcurrent relay having a definite time setting of 1.1 seconds. Continuing the loop circuit from the source A through the primary network feeder circuits 1 and 2 and back to the intersection point through the primary network circuit 3, it is necessary to provide an overcurrent relay associated with the circuit breaker 3—C, the time-delay setting for which is 0.6 second, and the time-delay setting of the overcurrent relay associated with the circuit breaker 3—A is made 1.1 seconds.

Since the definite time setting of the overcurrent relay associated with the circuit breaker 1—A has been arbitrarily set as 0.6 second, it follows that the definite time-delay settings of the overcurrent relays associated with the remaining circuit breakers in the network system are predetermined, and the time delay of the particular overcurrent relay associated with each circuit breaker is, accordingly, indicated on the drawings.

The time setting for the overcurrent relays associated with the radial feeders may be of any desired value, inasmuch as power is supplied at only the one end, but it should be less than the settings of the relays on the network feeders. The time settings for these relays on all of the radial feeders is indicated as 0.1 second, the desired time delay depending on the particular system application.

Directional relays are associated with the circuit breakers serving to connect the network transformers to the interconnection points of the primary network feeders, and such relays may be of the type utilized in the low voltage secondary network systems, wherein a suitable network switch is controlled, and effects a predetermined connection and disconnection of a feeder circuit to the network load. In most applications, it is desirable to design and adjust these directional relays to effect the opening of their associated circuit breakers and thereby disconnect the network transformers in the event of transformer or other source faults before any of the circuit breakers in the network feeders are opened by the resulting over-current. The protective scheme for controlling the network transformer circuit breakers will be considered hereafter.

The sequence of events resulting from a fault on one of the primary feeders will now be considered in detail. Assuming the primary feeder 6 to be grounded or short circuited at 46 and all of the sources A, B and C to be supplying power to the network, current is fed from the source C through transformers 27 and 32 to the fault 46, fault current is also supplied from the source B through transformers 22 and 23, and the source A also delivers current to the fault 46 through transformer 16 and a smaller amount through transformers 12 and 18. As a result of this flow of fault current, the circuit breakers 4—C, 6—A, 7—C and 8—A are opened in 0.6 second by the actuation of their respective overcurrent relays. The reason more of the breakers controlled by relays having definite time settings of 0.6 second do not open, is because, in some cases, the fault current through their associated feeders is below the value for which the relays are set to operate. In other cases, the fault current is not greatly above the value of current for which the relays are set to operate and, due to the fact that the usual definite time induction type overcurrent relay has an inverse current-time characteristic, until the current has reached several times the minimum value for which the relays are set to operate, the relays do not close their trip contacts before the flow of fault current is interrupted, due to the opening of the breakers through which the large values of fault current flow.

It will be noted from the above, that the breakers 4—C, 7—C and 8—A are opened in addition to the breaker 6—A in the faulty feeder. However, the service to the loads being served by the non-faulty feeders is not interrupted, because the primary feeders 4 and 8 are maintained alive by the source B through transformers 22 and 23, respectively, and the primary feeder 7 is maintained alive by the source A through transformer 16.

The circuit breaker 6—C is opened 0.5 second later or 1.1 seconds after the occurrence of the fault, thereby effecting the isolation of the faulty feeder 6. However, it has been found in practice that as many as 80% of the primary feeder faults are self-clearing in character if voltage is temporarily removed from them and it is advisable, therefore, to reclose the circuit breakers to determine if the fault has disappeared. Automatic reclosing means for all of the circuit breakers is necessary, since it is obvious that the circuit breakers 4—C, 7—C and 8—A should be reclosed irrespective of the existence or non-existence of the fault on feeder 6.

The protective scheme of the present invention, therefore, functions to effect at least one reclosing of all of the circuit breakers which have opened, and the circuit breakers having the longest tripping time are provided with the shortest reclosing time. The reclosing means associated with the circuit breaker 6—C is adapted to effect the reclosure thereof in 15 seconds, and if the fault at 46 has cleared itself the circuit breaker 6—C remains closed and power is supplied to the feeder 6 from the source C through transformer 27.

The reclosing time for each of the circuit breakers 6—A, 8—A, 7—C and 4—C is dependent upon the energized condition of the network feeder associated with each breaker. If there is voltage on the network feeder side of the circuit breaker having the short-time opening means associated therewith, the reclosing time is made to be one minute, while if there is no voltage on the network feeder side of the breaker, the reclosing time is shortened to 30 seconds.

Again referring to the faulty feeder 6, and assuming that the fault 46 has cleared itself and that the circuit breaker 6—C has been reclosed and latched, the circuit breaker 6—A is reclosed in one minute after the opening thereof due to the occurrence of fault 46, and the feeder 6 is energized and power is supplied to the feeder 6 from the sources C and A through the transformers 27 and 16, respectively.

The reclosing means associated with each of the circuit breakers 4—C, 7—C and 8—A effect the reclosure of these breakers at the same time that the circuit breaker 6—A is reclosed, with the result that all of the feeders and the circuit breakers associated therewith are re-energized after the lapse of one minute and 0.6 second upon the occurrence of the fault 46.

However, in the event that the circuit breakers 6—A, 7—C, 8—A and 4—C are actuated to their open positions 0.6 second after the occurrence of the fault 46 and the circuit breaker 6—C is opened 0.5 second later, and the fault 46 does not clear itself within the 15 seconds required for the reclosure of the circuit breaker 6—C, or re-establishes itself upon the reclosure of breaker 6—C, the circuit breaker 6—C is again opened in 1.1 seconds and locked in open position.

Since the breaker 6—C is opened, no voltage exists on the network feeder side of the open circuit breaker 6—A, with the result that the reclosing means associated with the breaker 6—A is actuated to effect the reclosure of the breaker 6—A in 30 seconds. If the fault 46 has not cleared itself at the termination of this time, the breaker 6—A will again be opened in 0.6 second and locked in open position. The faulty feeder 6 is thus isolated at both ends and the reclosing means associated with each of the circuit breakers 7—C, 8—A and 4—C is effectively energized to reclose its breaker after the lapse of one minute and 0.6 second after the occurrence of the fault 46.

From the foregoing explanation, it is clear that when the primary network is being supplied with power from all of the sources A, B and C, the occurrence of a fault on one of the network feeders does not prejudice the power supply to any of the loads connected to any but the faulty feeder, and when such fault is cleared before the reclosure of the long-time-opening circuit breaker, the power supply to such feeder is re-established within 16.1 seconds after the occurrence of the fault and all of the remaining circuit breakers are reclosed 44.5 seconds later.

It is also clear that when the fault does not clear itself, the faulty network feeder is entirely isolated 31.2 seconds after the fault occurs and the short-time-opening breakers in the adjacent feeders are reclosed in the same time as when the fault cleared itself, namely, one minute and 0.6 second after the occurrence of the fault.

In the above consideration of the various circuit breaker openings resulting from the fault 46, it was assumed that all of the sources A, B and C were supplying power to the primary network and under such conditions, there was no interruption to the load supplied by any of the primary network feeders except that connected to the faulty feeder.

Assuming that the fault 46 occurs on the feeder 6, as shown, and that the source C is not supplying power through the distribution transformers 27 and 32, the relay control apparatus for the respective circuit breakers will function as follows:

The over-current relays associated with the circuit breakers 6—A, 8—A and 4—C are effectively energized to open their associated circuit breakers in 0.6 second after the occurrence of the fault 46. Network transformer 32 being out of service, there is not sufficient fault current flowing through circuit breaker 7—C to actuate the over-current relays associated with it to close their trip contacts before breaker 6—A opens. Since the source C is out of service and no power is being supplied to the circuit breaker 6—C, inasmuch as the circuit breakers 4—C and 6—A have opened, there is no current available for effecting the actuation of the long-time delay over-current relay associated with the circuit breaker 6—C. However, the protective scheme associated with each primary feeder circuit breaker is provided with means for effecting the opening of the circuit breaker when there is an absence of potential on both sides of the breaker. Breaker 6—C, therefore, opens due to the absence of potential on both sides thereof. Since there is no potential on the network feeder side of the circuit breaker 6—A, the reclosing means associated with this breaker effects the reclosure thereof within 30 seconds after the breaker was opened due to the fault 46.

In the event that the fault 46 has cleared itself by the time that the circuit breaker 6—A is reclosed, the protective apparatus associated with this circuit breaker functions to latch the breaker in closed position and the feeder 6 is energized from the source A through the transformer 16. The reclosing of the circuit breaker 6—A energizes the network feeder side of circuit breaker 6—A and, since the reclosing apparatus associated with breaker 6—C is adapted to effect the reclosing thereof in the event of the existence of potential on either or both sides thereof, the circuit breaker 6—C is actuated to its closed position in 15 seconds. One minute after the opening of the circuit breakers 4—C and 8—A, the relay apparatus associated with these respective breakers operate to effect their reclosure. It will thus be seen that, even with one of the sources out of service and assuming that the fault condition clears itself, the service will not be interrupted to any of the feeder loads except those associated with the faulty network feeder 6 and the radial feeders 29 and 31. Feeder 6 is only out of service a sufficient length of time to enable the circuit breaker 6—A to be reclosed. It follows, therefore, that the feeder 6 is again energized to supply its particular loads in 30.6 seconds after the occurrence of the fault 46. The radial feeders 29 and 31 are again energized upon the reclosure of circuit breaker 4—C one minute and 0.6 second after the fault 46 occurred.

Next, assuming that the source C is out of service, that the fault 46 occurs on the feeder 6, and that the fault does not clear itself, the operation of the present invention with reference to the several circuit breakers will now be considered.

Upon the occurrence of the fault 46, the circuit breakers 6—A, 8—A and 4—C are again actuated to their open positions in 0.6 second and, as soon as the circuit breaker 4—C is opened, the circuit breaker 6—C is opened because of the absence of potential on both sides of the breaker. Since the network feeder side of the circuit breaker 6—A is now deenergized, the circuit breaker 6—A is reclosed in 30 seconds and, since the fault 46 has not cleared itself, the circuit breaker 6—A is again opened in 0.6 second and is locked in the open position.

The circuit breakers 4—C and 8—A are reclosed 30 seconds later or one minute after the original opening thereof, and the intersection of the feeders 4 and 6 is again energized and the circuit breaker 6—C is reclosed in 15 seconds. Current is again fed to the fault 46 from the source B through transformer 22, the circuit breaker 4—C is again opened in 0.6 second, and circuit breaker 6—C opens due to the absence of potential on both sides of the breaker. The circuit breaker 4—C was in its closed position for 15 seconds while the breaker 6—C was reclosing and the reclosing relay for the circuit breaker 4—C had time to partially reset. Therefore, the breaker 4—C will reclose a second time in about 15 seconds, and this second energization of the intersection point of the feeders 4 and 6 causes the relay apparatus associated with the circuit breaker 6—C to operate to latch it in open position.

After the circuit breaker 4—C is thus reclosed, and the circuit breaker 6—C is locked in its open position, the protective apparatus associated with the circuit breaker 4—C is actuated to maintain this breaker in closed position, and the protective apparatus is returned to its normal condition and thereby reset to effect the opening of the circuit breaker 4—C upon the occurrence of any other fault condition on the energized feeders associated with the primary network feeder 4.

It will be noted that, under the fault conditions just considered where the source C is out of service and where the fault 46 does not clear itself, the service to the radial feeders 29 and 31 is interrupted for about 1.5 minutes before being permanently restored. However, the service is not interrupted to the loads connected to any of the primary feeders in the network system with the exception of the faulty feeder 6.

It will also be noted that there is a possibility of sufficient current passing through some of the other feeder circuit breakers, besides those mentioned, to cause them to open. However, it is doubtful that enough current will pass through these breakers to cause the overcurrent relays associated therewith to be fast enough to cause the tripping of the circuit breakers, due to the inverse load-time characteristics of the definite-time induction-type overcurrent relays at small overloads. As referred to hereinbefore, the protective scheme of the present invention does not depend upon the inverse load-time characteristic of the overcurrent relays for its satisfactory operation. However, this inherent characteristic does tend to reduce the number of extra breaker openings, and, under usual system conditions, as considered in a primary network of the type shown in Fig. 1, only those breakers which have been mentioned will be opened due to the fault current flowing through their respective associated feeders.

Next, assuming that a fault occurs at 47 on the primary network feeder 1 and that the sources A, B and C are supplying power to the primary network, the operation of the protective relay apparatus associated with the respective feeder circuit breakers will be considered.

Upon the occurrence of the fault 47, the circuit breakers 1—A, 3—C and 4—C are actuated to their open positions in 0.6 second, the fault current being supplied to the fault 47 from the source A through transformer 12, from the source B through transformer 22 and from the source C through transformers 27 and 32.

Before the circuit breaker 3—C was opened, the greater portion of the fault current being supplied by the source C through transformer 32 flowed through the feeder 3 to the fault 47 and only a small part of it flowed in the feeder 2. However, upon the opening of the current breaker 3—C at the end of 0.6 second, the source C supplies fault current to the fault 47 through the transformer 32 and the feeder 2. As a result, the circuit breaker 2—B is adapted to be actuated to its open position in 0.6 second after the opening of the circuit breaker 3—C. However, the total time required for the circuit breaker 2—B to be actuated to its open position, after the occurrence of the fault 47, must be the sum of the time required for the circuit breaker 3—C to open, and the time required for the circuit breaker 2—B to open due to the flow of fault current in the feeder 2. It follows, therefore, that the time required for the circuit breaker 2—B to be opened after the occurrence of the fault 47 would be 0.6 second plus 0.6 second or 1.2 seconds.

In the meantime, the circuit breaker 1—B is actuated to its open position in 1.1 seconds after the occurrence of the fault 47, and, theoretically, it is possible that the circuit breaker 2—B will not be actuated to its open position, inasmuch as the circuit to the fault 47 is not completed through the feeder 2 after circuit breaker 1—B opens. Obviously, the difference between the opening times of the short time opening circuit breakers and the long time opening circuit breaker may be so determined as to ensure that the circuit breaker 2—B will not be actuated to its open position.

The circuit breaker 3—A is not actuated to its open position, inasmuch as the circuit breaker 3—C is opened, and it is obvious that the loads connected to the feeder 3 and the primary laterals 38 and 39 will not be interrupted.

The circuit breaker 1—B is reclosed in 15 seconds after the opening thereof, and if the fault 47 has cleared itself, the circuit breaker will be maintained in its closed position. Since the network feeder 1 is now energized, the reclosing time for the circuit breaker 1—A is one minute, and the circuit breakers 1—A, 3—C and 4—C are actuated to their closed positions in one minute after the opening thereof. In the event that the circuit breaker 2—B was opened due to the fault current flowing through the feeder 2, the reclosure of this circuit breaker would also take place in one minute after the opening thereof.

With a fault 47 on the network feeder 1 and all sources A, B and C supplying power to the primary network, the operation of the protective relay apparatus associated with the respective feeder circuit breakers will be considered assuming the fault 47 does not clear itself.

Upon the occurrence of the fault 47, the circuit breakers 1—A, 3—C and 4—C are actuated to their open position in 0.6 second. Circuit breaker 1—B opens in 1.1 seconds, recloses 15 seconds later, and opens a second time in 1.1 seconds and is latched in the open position. Since network feeder 1 is deenergized breaker 1—A recloses in 30 seconds, is actuated to its open position in 0.6 second and locked out. This permanently disconnects the faulty feeder 1 from the network system until repairs are made and circuit breakers 1—A and 1—B are manually reclosed.

Breakers 3—C and 4—C are actuated to their closed positions one minute after the opening thereof due to the occurrence of the fault 47, thus restoring all breakers to their normal closed position except those on the faulty feeder 1.

Assuming the fault 47 occurs on feeder 1 and that the source A is out of service, the operation of the present invention is as follows. The circuit breakers 1—A, 3—C and 4—C are actuated to their open positions in 0.6 second, and the circuit breaker 3—A is actuated to its open position due to the absence of potential on both sides thereof. About 0.5 second later or 1.1 seconds after the occurrence of the fault 47, the circuit breaker 1—B is actuated to its open position, and the circuit-breaker 2—B may or may not be actuated to its open position for the reasons pointed out hereinbefore. However, it is again noted that the difference between the opening times of the several feeder circuit breakers may be so determined that the circuit breaker 2—B will not be actuated to its open position.

The circuit breaker 1—B is actuated to its closed position in 15 seconds after the opening thereof, and since the fault 47 has not cleared itself, the breaker 2—B will be actuated to its open position in 0.6 second and the breaker 1—B will be again actuated to its open posiiton in 1.1 seconds. The protective apparatus associated with breaker 1—B is thereupon actuated to lock the circuit breaker 1—B in its open position and the breaker 2—B is reclosed in one minute after the opening thereof.

Due to the fact that the source A is out of service, the network feeder 3 is deenergized, and the reclosing means associated with the circuit breaker 3—C is energized to effect its closure 30 seconds after the opening thereof. The network feeder 3 is energized, therefore, and the reclosing means associated with the circuit breaker 3—A is effectively energized to close the circuit breaker 3—A in 15 seconds to thereby effect the energization of the connection point of the feeders 1 and 3.

The energization of the connection point between the feeders 1 and 3 effects the energization of the closing means associated with the circuit breaker 1—A, and, since there is no voltage on the network feeder side of the circuit breaker, the circuit breaker 1—A is reclosed in 30 seconds. The total time required for the connection point of the feeders 1 and 3 to become re-energized is equal to the sum of the reclosing time for the circuit breakers 3—C and 3—A. This time is equal to the 30 seconds for the reclosing of breaker 3—C plus the 15 seconds required for the reclosing of the breaker 3—A. Obviously, before the circuit breaker 1—A is actuated to its closed position, the circuit breaker 4—C reclosed within one minute after the original opening thereof, and 15 seconds later the circuit breaker 1—A is actuated to its closed position. Since the fault 47 has not cleared itself, the circuit breakers 1—A and 3—C are again actuated to their open positions in 0.6 second, and the circuit breaker 3—A is opened 1.6 seconds later due to the absence of voltage on both sides thereof.

The circuit breaker 2—B is actuated to its closed position in one minute after the opening thereof and it is obvious that this closing is effected after the second opening of breakers 1—A and 3—C. The circuit breaker 3—C is again actuated to its closed position in 30 seconds after the opening thereof due to the absence of potential on the network feeder 3, and the circuit breaker 3—A is again actuated to its closed position 15 seconds later. The energization of the connection point of the network feeders 1 and 3 results in the reclosing means associated with the breaker 1—A being energized to lock the breaker 1—A in its open position, thereby completely isolating the feeder 1 from the primary network.

It will be noted from the above that the circuit breaker 2—B may open twice, and in the event that such breaker opening is objectionable from a maintenance standpoint, the operation of the present invention may be altered to obviate this objection.

The reclosing time periods of the short time opening circuit breakers may be altered to obviate this objectionable breaker opening. The reclosing times of these particular breakers may, therefore, be made to be 30 seconds when there is no potential on the feeder side of the breaker, and 1 minute and 30 seconds when there is voltage on both sides of the breaker.

Obviously, in the event that the second opening of circuit breakers in network feeders included in loop circuits other than the loop circuit on which the fault occurs are objectionable, the reclosing time for each of the short time opening circuit breakers will have to be changed to 1 minute and 30 seconds throughout the network system, inasmuch as the reclosing time of all of the similar circuit breakers must be the same.

From the foregoing explanation, it is clear that the protective apparatus associated with each feeder circuit breaker functions to isolate any faulty feeder in the event that the fault condition does not clear itself, and also that any other circuit breakers which have been opened, due to the flow of fault current, are reclosed to effect the normal network connections. It is not believed necessary to consider the operation of the present invention in the event of faults occurring elsewhere in the network system, in view of the explanation with respect to the occurrence of the two faults 46 and 47.

However, it may be noted that a fault on the network feeder 4 with the source C out of service and the fault being of a non-clearing nature would result in the objectionable second opening of breaker 8—A when the reclosing time for the short time opening breakers is one minute when the network feeder sides of such breakers are energized. Under such possible fault conditions, the reclosing time of the short time opening breakers should be one minute and 30 seconds when the network feeder sides thereof are energized.

The relay protective apparatus, associated with the radial feeders 14, 21, 29 and 31, may be exactly the same as that provided for the primary network feeder circuit breakers. Any arbitrary tripping time setting may be provided, such as 0.1 second. It is also clear that the network system may be extended without other than minor changes in the relay or relay settings, and such extension might be provided by connecting another source (not shown) to the end of one of the radial feeders, such as radial feeder 31, and the radial feeder 29 may be connected to this connection point and, if necessary, radial feeders may be associated with such additional supply source.

In other words, extensions of the primary network system may be made without any change in the relays on the existing circuits, and it is not even necessary to change the setting of the relays on any of the circuits, except those directly affected such as the former radial feeders. Under such extension conditions, it would be necessary to alternate the over-current relay settings, associated with the adjacent circuit breakers in the new loop circuit and give the reclosing relays the reclosing times adapted for the particular over-current relay settings. Assuming that the radial feeders 29 and 31 were energized from an additional source, as mentioned above, it would be necessary to provide the over-current relays, associated with the circuit breaker 29—C, with a time-delay setting of 1.1 seconds, and the reclosing relay would be given a reclosing-time setting of 15 seconds. The over-current relays, associated with the circuit breaker 31—C, would be provided with a definite time-delay setting of 0.6 second and the reclosing relay would be set to reclose in 30 seconds or one minute, depending upon whether the associated feeder 31 is de-energized or energized or in one minute and 30 seconds to obviate objectionable breaker openings with respect to possible fault conditions on the system. By following this system of relay settings, the distribution system may be extended indefinitely, without jeopardizing the satisfactory operation of the primary network or the protective scheme disclosed in the present invention.

Referring more particularly to Fig. 2 of the drawings, the operation of the protective apparatus, associated with one of the primary network feeder circuit breakers, will be considered in detail, and such circuit breaker will first be considered as corresponding to the circuit breaker 6—A in the primary feeder 6, as shown in Fig. 1.

In Fig. 2, the circuit breaker 6—A is shown in its closed position and serves to connect the feeder 6 to the feeders 7 and 8, and the respective feeders 6, 7 and 8 are considered as being in normal energized condition and no faults to exist on any of the primary feeders in the network system.

A current transformer 51 is associated with the feeder 6, the primary winding 52 thereof being indicated as one of the conductors of the feeder 6, and the secondary winding 53 thereof is adapted to energize the winding 54 of an induction-type overcurrent relay 56. The relay 56, as illustrated, comprises a C magnet 57, short-circuit turn or shading coil 58, disk armature 59, rotating shaft or spindle 61, damping magnet 62, restraining spring 63, moving contact member 64, and stationary contacts 66. It is obvious that a definite time-delay of operation may be imparted to such relay, in any well known manner.

A voltage transformer 67 has the primary winding 68 thereof connected across the conductors of feeder 6 on the intersection side of the circuit breaker 6—A, and the secondary winding 69 thereof connected to the energizing winding 71 of a time-delay voltage-responsive relay 72. The voltage-responsive relay 72 is adapted to be energized when the voltage transformer 67 is energized, and the moving contact segment 73 is normally maintained out of engagement with the stationary contacts 74.

A second voltage transformer 76 has the primary winding 77 thereof connected across the feeder 6 on the network feeder side of the circuit breaker 6—A, and the secondary winding 78 thereof is adapted to energize the energizing winding 79 of a voltage responsive relay 81. When the feeder 6 is in energized condition, the relay 81 is effectively energized to effect the closing of stationary contacts 82 by means of a contact segment 83. When the network feeder 6 is deenergized, the energizing winding 79 of the relay 81 is also deenergized, and the stationary contacts 84 and 86 are adapted to be bridged by the contact segments 87 and 83, respectively.

The circuit breaker 6—A is provided with a closing coil 88 and a tripping coil 89. The circuit breaker is also provided with pallet switches 91 and 92 and stationary contacts 93, 94, 96 and 97. When the circuit breaker is in its closed position, the pallet switches 91 and 92 are adapted to effect the bridging of the stationary contacts 93 and 96, respectively, and when the circuit breaker is in its open position, the pallet switches 91 and 92 are adapted to bridge the stationary contacts 94 and 97, respectively.

A voltage responsive relay 98 has the energizing winding 99 thereof connected across the secondary terminals of the voltage transformer 76, and is adapted to be effectively energized only when the network feeder 6 is in energized condition. The relay 98 is provided with stationary contacts 101 and 102 and contact segment 103. When the relay 98 is energized, the stationary contacts 101 are adapted to be bridged by the contact segment 103, and when the relay 98 is deenergized, the stationary contacts 102 are adapted to be bridged by the contact segment 103.

A normally deenergized relay 104, as illustrated, includes an energizing winding 106, stationary contacts 107 and 108 and contact segment 109. The energizing source for the winding 106, not shown, will be referred to in detail in the explanation relating to Fig. 3 of the drawings. In its normal deenergized condition, the relay 104 is adapted to bridge the contacts 108 by means of the contact segment 109 and when energized the relay is actuated to bridge contacts 107 by means of contact segment 109.

A voltage responsive relay 111 comprises an energizing winding 112, stationary contacts 113 and 114 and contact segments 116 and 117. When the winding 112 is deenergized, the contact segments 116 and 117 are adapted to be held out of engagement with the stationary contacts 113 and 114, respectively, and when the winding 112 is energized, the stationary contacts 113 and 114 are adapted to be bridged by the contact segments 116 and 117, respectively.

A drum-type relay 118 is also provided and, as indicated, comprises an operating motor 119 and a contact drum 121. The field of the motor 119 comprises two field windings 122 and 123 and an external reactance 124. With such arrangement, the motor 119 may be referred to as a split-phase motor and is adapted to rotate in either direction depending upon the energizing circuit provided for the field windings 122 and 123. It will be assumed that the phase rotation provided by the field windings 122 and 123 will be in a direction to effect the rotation of the motor 119 and contact drum 121, in the direction indicated by the arrow, when the energizing circuit for the field windings is effected through the terminals connected to the field winding 123. However, the motor 119 is adapted to rotate the contact drum 121 in the reverse direction when the field energizing circuit is completed from the terminals connected to the field winding 122. In this manner, the reactance 124 serves as a phase-splitting arrangement, and it is obvious that any reversing motor may be utilized for operating the contact drum 121.

The contact drum, shown in developed form, comprises contacting segments 126, 127, 128, 129 and 131. Stationary contacts 1' to 8' are provided, and are adapted to be bridged by predetermined contact segments on the contact drum 121.

The stationary contacts 1' and 2' are adapted to be bridged by contact segments 126 and 127, and the contacts 3', 4' and 5' cooperate with the contact segment 128 under predetermined conditions. The stationary contact 6' is adapted to cooperate with only the contact segment 129, the stationary contact 7' is adapted to cooperate with the contact segments 129 and 131, and the contact 8' is adapted to cooperate with the contact segment 131 only.

When the circuit breaker 6—A is closed and normal conditions exist on the network feeders 6, 7 and 8, the contact drum 121 is in the position shown, and electrical contact is only made between the stationary contacts 3' and 4' by means of the contact segment 128. The motor 119 is deenergized, since the circuit through the field winding 122 and the contacts 93 and pallet switch 91 of the breaker 6—A is open, since the stationary contact 5' associated with the contact drum 121 is not electrically connected to the stationary contact 4'. The other circuit for the motor 119 is also deenergized, inasmuch as one terminal of the field winding 123 is connected to one of the open stationary contacts 94 associated with the circuit breaker 6—A.

All of the protective apparatus associated with the circuit breaker 6—A and the network feeder 6 are indicated in the positions assumed when normal energized conditions exist on the network feeders 6, 7 and 8. It is quite obvious that under conditions when the relay 72 is normally energized to open the stationary contacts 74 thereof, and relay 111 is normally deenergized to maintain the stationary contacts 113 open, the respective energizing circuits for the trip coil 89 and the closing coil 88 of the breaker 6—A are incomplete and the circuit breaker 6—A is maintained in its closed position.

Assuming that the feeder 6 is accidentally grounded, as at 46, the operation of the protective apparatus associated with the breaker 6—A is as follows:

The over-current relay 56 is designed and adjusted to effect the bridging of the stationary contacts 66 by means of the moving contact 64 in 0.6 second after the occurrence of the fault 46. The voltage on the network feeder 6 is reduced to substantially zero, because of the fault 46, the energizing winding 79 of the voltage-responsive relay 81 is deenergized and the contact segments 87 and 83 effect the bridging of stationary contacts 84 and 86, respectively. The voltage-responsive relay 98 is also actuated to its deenergized position, and the stationary contacts 102 are bridged by the contact segment 103, as a result of the deenergization of the energizing winding 99.

The bridging of the stationary contact 66 by means of the moving contact 64, of the over-current relay 56, completes an energizing circuit for the trip coil 89 of the circuit breaker 6—A.

This energizing circuit may be traced from one terminal of a direct-current source, such as battery 132, through the stationary contacts 66 and the moving contact 64 of the over-current relay 56, contacts 96 and pallet switch 92 of the circuit breaker 6—A, trip coil 89, and thence to the other terminal of the direct current source 132.

The circuit breaker 6—A, is, therefore, actuated to its open position in 0.6 second upon the occurrence of the fault 46. It will also be noted that the voltage-responsive relays 81 and 98 were the only other relays which were immediately affected by the occurrence of the fault 46 because of the time delay imparted to relay 72. The time delay setting for this relay is made slightly more than the longest opening time required for any of the overcurrent relays. Obviously, this time delay in opening should be slightly longer than 1.1 seconds or about 1.6 seconds. The reason for making this time delay more than 1.1 seconds is in order to ensure that the breakers 7—A and 8—A will not be opened under possible fault conditions when one or more of the sources A, B and C are connected to the network. In other words, sufficient time delay is provided in order to permit the opening of the long-time opening breaker in the faulty feeder and thus avoid unnecessary breaker openings on the good feeders.

Upon the actuation of the circuit breaker 6—A to its open position, the stationary contacts 94 are bridged by the pallet switch 91 and an energizing circuit is completed for the motor 119 and this motor is rotated in the direction indicated by the arrow adjacent the contact drum 121. This energizing circuit for the motor 119 may be traced from one secondary terminal of the voltage transformer 67, through the field winding 123 of the motor 119, and also through a parallel circuit consisting of field winding 122 and reactor 124, contacts 94 and pallet switch 91 of the circuit breaker 6—A, stationary contact 3', contact segment 128 and stationary contact 4' associated with the contact drum 121, contacts 108 and contact segment 109 of the normally deenergized relay 104, contacts 102 and contact segment 103 of the voltage-responsive relay 98, and thence to the remaining secondary terminal of the voltage transformer 67.

The rotation of the contact drum 121 is continued in the direction indicated by the arrow until the stationary contacts 1' and 2' are bridged by the contact segment 126. Upon the bridging of the contacts 1' and 2', an energizing circuit is completed for the winding 112 of the relay 111 and this energizing circuit may be traced from one secondary terminal of the voltage transformer 67, through conductor 133, contacts 97 and pallet switch 92 of the circuit breaker 6—A, energizing winding 112 of the relay 111 stationary contacts 1' and 2' and contact segment 126 of the contact drum 121, stationary contacts 108 and contact segment 109 of the normally deenergized relay 104, stationary contacts 102 and contact segment 103 of the deenergized relay 98, and thence to the remaining secondary terminal of the voltage transformer 67.

The relay 111, is therefore, effectively energized to bridge the stationary contacts 113 and 114 by means of the contact segments 116 and 117, respectively. The bridging of the stationary contacts 114 by the contact segment 117 completes a holding circuit for the energizing winding 112, which holding circuit may be traced from one secondary terminal of the voltage transformer 67, conductor 133, stationary contacts 97 and pallet switch 92 of the circuit breaker 6—A, energizing winding 112 of the relay 111, stationary contacts 114 and contact segment 117, stationary contacts 108 and contact segment 109 of the normally deenergized relay 104, stationary contacts 102 and contact segment 103 of the deenergized voltage relay 98, and thence to the remaining secondary terminal of the voltage transformer 67.

The relay 111 is, therefore, effectively energized to bridge the stationary contacts 113 by means of the contact segment 116 even after the contact segment 126, associated with the contact drum 121, has opened the circuit between the stationary contacts 1' and 2' due to the continued rotation of the contact drum 121.

The motor 119 continues to rotate the contact drum 121 in the direction indicated by the arrow and the stationary contacts 6' and 7' are adapted to be bridged by the contact segment 129 on the contact drum 121. The contact segment 129 is so spaced on the contact drum 121 that the stationary contacts 6' and 7' are adapted to be bridged by the contact segment 129 in approximately 30 seconds after the circuit breaker 6—A has been actuated to its open position and the motor 119 thereby energized to effect the rotation of the contact drum 121.

Assuming that the fault 46 has not cleared itself, the voltage on the network feeder 6 will be substantially zero since both of its associated circuit breakers are open and the voltage responsive relay 81 will not be effectively energized with the result that the stationary contacts 86 thereof, will be bridged by the contact segment 83. It follows, therefore, that, upon the bridging of the stationary contacts 6' and 7' by the contact segment 129 of the contact drum 121, an energizing circuit is completed for the closing coil 88 of the circuit breaker 6—A. This energizing circuit may be traced from one secondary terminal of the voltage transformer 67, through conductor 133, stationary contacts 97 and pallet switch 92 of the circuit breaker 6—A, closing coil 88, stationary contacts 113 and contact segment 116 of the relay 111, stationary contacts 86 and contact segment 83 of the voltage responsive relay 81, stationary contacts 6' and 7' and the contact segment 129 of the contact drum 121, stationary contacts 108 and contact segment 109 of the normally deenergized relay 104, stationary contacts 102 and contact segment 103 of the voltage responsive relay 98, and thence to the other secondary terminal of the voltage transformer 67.

The circuit breaker 6—A is, therefore, actuated to its closed position by the energization of the closing coil 88 as a result of the bridging of the stationary contacts 6' and 7' by means of the contact segment 129 of the contact drum 121.

The reclosing of the circuit breaker 6—A effects the bridging of the stationary contacts 93 thereof by means of the pallet switch 91, and also results in the opening of the circuit formerly completed through the stationary contacts 94. The bridging of the stationary contacts 93 effects a different energizing circuit for the motor 119 which results in the rotation thereof in a reverse direction. This energizing circuit may be traced from one secondary terminal of the voltage transformer 67 through the field winding 122 of the motor 119 and also through a parallel circuit comprising field winding 123 and reactor 124, stationary contacts 93 and pallet switch 91 of the circuit breaker 6—A, stationary contact 5' contact segment 128 and stationary contact 4' associated with the contact drum 121, stationary contacts 108 and contact segment 109 of the normally deenergized relay 104, stationary contacts 102 and contact segment 103 of the deenergized relay 98, and thence to the remaining secondary terminal of the voltage transformer 67.

The reclosing of the circuit breaker 6—A also effects the deenergization of the winding 112 of the relay 111 since the pallet switch 92 is moved out of engagement with the stationary contacts 97, thereby interrupting the energizing circuit for the winding 112.

Inasmuch as it has been assumed that the fault 46 has not cleared itself, the over-current relay 56 is again effectively energized after a definite time delay of 0.6 second to bridge the stationary contacts 66 by means of the moving contact 64. The energizing circuit for the trip coil 89 of the circuit breaker 6—A is thereupon completed a second time and the circuit breaker 6—A is actuated to its open position. This trip circuit may be traced from one terminal of the direct current source 132 through stationary contacts 66 and moving contact 64 of the over-current relay 56, stationary contacts 96 and pallet switch 92 of the circuit breaker 6—A, trip coil 89, and thence to the other terminal of the direct current source 132.

The actuation of the circuit breaker 6—A to its open position opens the energizing circuit for the motor 119 by the movement of the pallet switch 91 out of engagement with the stationary contacts 93 associated with the circuit breaker 6—A, and the other energizing circuit for the motor 119 is completed from one secondary terminal of the voltage transformer 67, through the field winding 123 of the motor 119 and also through a parallel circuit comprising the field winding 122 and reactor 124, contacts 94 and pallet switch 91 of the circuit breaker 6—A, stationary contact 3', contact segment 128 and stationary contact 4' associated with the contact drum 121, stationary contacts 108 and contact segment 109 of the normally deenergized relay 104, stationary contacts 102 and contact segment 103 of the deenergized relay 98, and thence to the other secondary terminal of the voltage transformer 67.

The rotation of the motor 119 is, therefore, reversed by the actuation of the circuit breaker 6—A to its open position in 0.6 second after the reclosure thereof and the stationary contacts 6' and 7' are again bridged by the contact segment 129 of the contact drum 121. However, since the energizing winding 112 of the relay 111 is deenergized, the stationary contacts 113 thereof are not bridged by the contact segment 116 and the energizing circuit for the closing coil 88 of the circuit breaker 6—A is not completed.

Since the stationary contacts 6' and 7' are bridged by the contact segment 129 of the contact drum 121 substantially immediately after the reclosure of the circuit breaker 6—A and the resultant reversal of the direction of rotation of the motor 119 and the contact drum 121, the contact segment 126 of the contact drum 121 must be so spaced from the contact segment 129 in the direction of movement of the contact drum 121 that the over-current relay 56 is effectively energized to actuate the circuit breaker 6—A to its open position before the stationary contacts 1' and 2' are bridged by the contact segment 126.

Since the stationary contacts 1' and 2' are not permitted to be bridged by the contact segment 126 before the over current relay 56 is effectively energized to effect the second opening of the circuit breaker 6—A, the energizing circuit for the motor 119 is again changed and the motor 119 and the contact drum 121 are rotated in the original direction, as indicated by the arrow. This energizing circuit for the motor 119 may again be traced from one secondary terminal of the voltage transformer 67, through the field winding 123 of the motor 119 and also through a parallel circuit comprising the field winding 122 and reactor 124, stationary contacts 94 and pallet switch 91 of the circuit breaker 6—A, stationary contact 3', contact segment 128 and stationary contact 4' associated with the contact drum 121, stationary contacts 108 and contact segment 109 of the normally deenergized relay 104, stationary contacts 102 and contact segment 103 of the deenergized relay 98, and thence to the other secondary terminal of the voltage transformer 67. Obviously, the contact drum 121 is rotated in the direction indicated by the arrow until the stationary contact 3' is made to break contact with the contact segment 128. In this manner, the circuit breaker 6—A is effectively locked in its open position since it is impossible to provide any means of energization for the motor 119 when the stationary contact 3' is out of engagement with the contact segment 128 and also when the pallet switch 91, associated with the circuit breaker 6—A, is moved out of engagement with the stationary contacts 93.

From the foregoing explanation, it is clear that, upon the occurrence of a fault, such as fault 46 on the network feeder 6, the relay protective apparatus associated with the circuit breaker 6—A is adapted to effect the opening of the circuit breaker in 0.6 second after the occurrence of a fault 46 and, since the network feeder 6 is deenergized due to its associated circuit breakers being opened after 1.1 seconds, the protective apparatus functions to effect the reclosure of the circuit breaker 6—A in 30 seconds after the opening thereof. Upon this second reclosure of the circuit breaker 6—A, and assuming that the fault 46 still exists on the network feeder 6, the circuit breaker is again actuated to its open position in 0.6 second and the protective apparatus functions to lock the circuit breaker 6—A in its open position.

Next, assuming that the fault 46 is upon an adjacent feeder, such as feeder 4, or that the fault 46 clears itself before 15 seconds have elapsed after the opening of the circuit breaker 6—C, the function of the protective apparatus is as follows. It will be assumed, for the purposes of the following explanation, that the fault 46 occurs on the network feeder 6 and that such fault clears itself within 15 seconds after the opening of the circuit breaker 6—C due to the fault current flowing to the fault 46.

Upon the occurrence of the fault 46, the over current relay 56 is effectively energized to bridge the stationary contacts 66 thereof by means of the moving contact 64 in 0.6 second. An energizing circuit for the trip coil 89 of the circuit breaker 6—A is thereby completed from one terminal of the direct current source 132 through the stationary contacts 66 and moving contact 64 of the over-current relay 56, stationary contacts 96 and pallet switch 92 of the circuit breaker 6—A, trip coil 89, and thence to the other terminal of the direct current source 132. The circuit breaker 6—A is thereby actuated to its open position in 0.6 second after the occurrence of the fault 46.

Assuming that the fault 46 clears itself, and that the long-time-opening circuit breaker at the other end of the network feeder 6 has been reclosed and is supplying power to the network feeder 6, the voltage transformer 76 will be energized in accordance with the network feeder voltage and the voltage-responsive relays 81 and 98 will be effectively energized to bridge the respective stationary contacts 82 and 101 thereof by means of their respective contact segments 83 and 103.

Upon the actuation of the circuit breaker 6—A to its open position, an energizing circuit for the motor 119 is completed from one secondary terminal of the voltage transformer 76 through conductor 133, field winding 123 of the motor 119 and also through a parallel circuit comprising the field winding 122 and reactor 124, stationary contacts 94 and pallet switch 91 associated with the circuit breaker 6—A, stationary contact 3', contact segment 128 and stationary contact 4' associated with the contact drum 121, stationary contacts 108 and contact segment 109 of the normally deenergized relay 104, stationary contacts 101 and contact segment 103 of the energized voltage-responsive relay 98, and thence to the other secondary terminal of the voltage transformer 76.

The motor 119 is thereby effectively energized and rotates the contact drum 121 in the direction indicated by the arrow. The stationary contacts 1' and 2' are bridged by the contact segment 126 of the contact drum 121 and an energizing circuit is completed for the energizing winding 112 of the relay 111. The energizing circuit may be traced from one secondary terminal of the voltage transformer 76, through the stationary contacts 97 and pallet switch 92 associated with the circuit breaker 6—A, energizing winding 112 of the relay 111 stationary contacts 1' and 2' and contact segment 126 of the contact drum 121, stationary contacts 108 and contact segment 109 of the normally deenergized relay 104, stationary contacts 101 and contact segment 103 of the energized voltage-responsive relay 98, and thence to the remaining secondary terminal of the voltage transformer 76.

The relay 111 is thereupon effectively energized to bridge the stationary contacts 113 and 114 by means of the contact segments 116 and 117, respectively, and the bridging of the stationary contacts 114, by means of the contact segment 117, completes a holding circuit for the energizing winding 112. The holding circuit may be traced from one of the secondary terminals of the voltage transformer 76, through the stationary contacts 97 and pallet switch 92 associated with the circuit breaker 6—A, energizing winding 112 of the relay 111, stationary contacts 114 and contact segment 117, stationary contacts 108 and contact segment 109 of the normally deenergized relay 104, stationary contacts 101 and contact segment 103 of the energized voltage-responsive relay 98, and thence to the other secondary terminal of the voltage transformer 76.

The motor 119 continues to rotate the contact drum 121 in the forward direction indicated by the arrow and, 30 seconds after the actuation of the circuit breaker 6—A to its open position, the stationary contacts 6' and 7' are bridged by the contact segment 129 of the contact drum 121. However, since the voltage transformer 76 is energized, thereby resulting in the energization of the voltage-responsive relay 81, the contact segment 83 of the relay 81 is moved out of engagement with the stationary contacts 86. It follows, that the bridging of the stationary contacts 6' and 7' by the contact segment 129 does not complete an energizing circuit for the closing coil 88 associated with the circuit breaker 6—A.

The rotation of the contact drum 121 is continued in the forward direction until the stationary contacts 1' and 2' are again bridged by a contact segment 127 associated with the contact drum 121. However, since the relay 111 is still energized through the holding circuit completed through the stationary contacts 114 and contact segment 117 thereof, the bridging of the stationary contacts 1' and 2' by the contact segment 127 does not effect the energization or completion of any further electrical circuits.

The continued rotation of the contact drum 121 in the forward direction effects the bridging of the stationary contacts 7' and 8' by means of the contact segment 131 associated with the contact drum 121, and an energizing circuit is thereby completed for the closing coil 88 associated with the circuit breaker 6—A. This closing coil circuit may be traced from one secondary terminal of the voltage transformer 76, through stationary contacts 97 and pallet switch 92 associated with the circuit breaker 6—A, closing coil 88, stationary contacts 113 and contact segment 116 of the energized relay 111, stationary contacts 82 and contact segment 83 of the energized voltage-responsive relay 81, stationary contacts 7' and 8' and contact segment 131 associated with the contact drum 121, stationary contacts 108 and contact segment 109 of the normally deenergized relay 104, stationary contacts 101 and contact segment 103 of the energized voltage responsive relay 98, and thence to the other secondary terminal of the voltage transformer 76.

The energization of the closing coil 88 effects the reclosure of the circuit breaker 6—A and the time of closure thereof is determined by the position of the contact segment 131 on the contact drum 121. As referred to hereinabove, this time delay may be one minute and the contact segment 131 is so positioned on the contact drum 121 that the contact drum 121 must be rotated in the forward direction for one minute before the stationary contacts 7' and 8' are bridged by the contact segment 131.

The reclosure of the circuit breaker 6—A results in the energization of the motor 119 to effect the rotation of the contact drum 121 in the reverse direction. The energizing circuit for the motor 119 may be traced from one secondary terminal of the voltage transformer 76, conductor 133, through the field winding 122 of the motor 119 and also through a parallel circuit comprising the field winding 123 and reactor 124, contacts 93 and pallet switch 91 associated with the circuit breaker 6—A, stationary contact 5', contact segment 128 and stationary contact 4' associated with the contact drum 121, stationary contacts 108 and contact segment 109 of the normally deenergized relay 104, stationary contacts 101 and contact segment 103 of the energized voltage responsive relay 98, and thence to the other secondary terminal of the voltage transformer 76. The motor 119 is, therefore, effectively energized to rotate the contact drum 121 in the reverse direction until the stationary contact 5' becomes disengaged with the contact segment 128. The circuit breaker 6—A is, therefore, latched in its closed position and the contact drum 121 has been returned to its original normal position with the reverse energizing circuit for the motor 119 incomplete since there is no electrical connection between the stationary contacts 4' and 5'.

The functioning of the protective apparatus associated with circuit breaker 6—A, assuming the fault 46 to be on feeder 4, will be substantially the same as described above where it was assumed that fault 46 on network feeder 6 cleared itself in less than 15 seconds after the opening of breaker 6—C.

In order to prevent circuit breaker 6—A from locking out when a fault on another feeder is connected to the system 15 seconds after breaker 6—A reclosed in one minute, as previously described, it is necessary to put set-up segment 127 on drum 121 spaced about 10 seconds from reclosing segment 131 associated with drum 121. The spacing between set-up segment 126 and reclosing segment 129 associated with drum 121 should also be about 10 seconds. This means that if a feeder circuit breaker remains closed for about 10 seconds after reclosing it will reclose again.

Assume that the drum rotates in the reclosing direction, as indicated by the arrow, and just reaches the point where stationary contacts 7' and 8' are bridged by segment 131, thus reclosing circuit breaker 6—A as previously described. The reclosing of breaker 6—A reverses the direction of rotation of motor 119 and its associated drum 121, due to the opening of the circuit through contacts 94, and the closing of the circuit through contacts 93, associated with circuit breaker 6—A. After the drum 121 has rotated in the reverse direction for about 10 seconds, the contact segment 127 bridges the stationary contacts 1' and 2' but no electrical circuit is completed because contacts 97 associated with breaker 6—A are open. The drum 121 continues to rotate in the reverse direction for about 5 seconds more and the feeder circuit breaker, associated with the faulty feeder, recloses and connects the fault to the network system again. The flow of fault current through breaker 6—A actuates over-current relay 56 to open the breaker 6—A in 0.6 second, as previously described.

The opening of circuit breaker 6—A again changes the direction of rotation of motor 119, and causes drum 121 to rotate again as indicated by the arrow. After about 5 seconds the contact segment 127 associated with drum 121, bridges the stationary contacts 1' and 2', thus energizing voltage relay 111, which operates to seal itself in the operated position and also makes possible the reclosing of breaker 6—A, due to the bridging of the contacts 113 of relay 111, as previously described. About 10 seconds later segment 131 bridges stationary contacts 7' and 8' thus reclosing circuit breaker 6—A, as previously described. The closing of breaker 6—A reverses the direction of motor 119 and drum 121 which, since both the feeder breakers on the faulty circuit have now locked open, will continue to run in the reset direction until stationary contact 5' becomes disengaged from segment 128. This opens the circuit of motor 119 thus leaving the protective equipment of circuit breaker 6—A reset and ready for the next case of trouble.

The description of the operation of the protective apparatus associated with the short-time-opening circuit breaker 6—A has been considered on the assumption that the intersection point of the network feeders 7 and 8 was alive and that the voltage transformer 67 was energized. However, the protective apparatus associated with each network feeder circuit breaker is adapted to effect the opening of such circuit breaker in the event that there is an absence of potential on both sides of the circuit breaker. The operation of the present invention in this respect will now be considered.

Assuming the circuit breaker 6—A in its closed position and that there is an absence of potential on both sides thereof, the voltage transformers 67 and 76 will be deenergized with the result that the voltage-responsive relays 72 and 81 will also be deenergized. Under such system conditions, the stationary contacts 74 of the relay 72 are bridged by the contact segment 73 and the stationary contacts 84 of the relay 81 are bridged by the contact segment 87. This deenergization of the voltage responsive relays 72 and 81 effects an energizing circuit for the trip coil 89 associated with the circuit breaker 6—A and such energizing circuit may be traced from one terminal of the direct-current source 132, through the trip coil 89, stationary contacts 96 and pallet switch 92 associated with the circuit breaker 6—A, stationary contacts 74 and contact segment 73 of the relay 72, stationary contacts 84 and contact segment 87 of the relay 81, and thence to the other terminal of the direct-current source 132. Obviously, therefore, the circuit breaker 6—A is actuated to its open position in the event of an absence of potential on both sides of the circuit breaker.

The feature of opening in the event of an absence of potential on both sides of the circuit breaker is essential as far as the satisfactory operation of the long-time-opening network feeder circuit breakers are concerned. It is included on the short-time-opening network feeder circuit breakers more as a precautionary or back-up measure than as an essential feature. The method in which it functions is, of course, the same in either case.

The operation of the protective apparatus associated with the long-time-opening network feeder circuit breakers will now be considered. First, the circuit breaker 6—A will be assumed to be the circuit breaker 6—C, as shown in Fig. 1, and the over-current relay 56 will be assumed to have a definite time-delay setting of 1.1 seconds. Next assuming the fault 46 to occur on the network feeder 6, the over-current relay 56 is effectively energized to bridge the stationary contacts 66 by means of the moving contact 64 in 1.1 seconds, with the result that an energizing circuit is completed for the trip coil 89 associated with the circuit breaker 6—A. This energizing circuit may be traced from one terminal of the direct-current source 132, through the stationary contacts 66 and moving contact 64 of the over-current relay 56, stationary contacts 96 and pallet switch 92 associated with the circuit breaker 6—A, trip coil 89, and thence to the other terminal of the direct-current source 132. As a result of the completion of this energizing circuit, the circuit breaker 6—A is actuated to its open position in 1.1 seconds after the occurrence of the fault 46.

Assuming that the fault 46 does not clear itself within 15 seconds, the protective apparatus associated with the circuit breaker 6—A functions to lock the circuit breaker 6—A in open position after one reclosure thereof.

The only changes necessary in the remaining elements in the protective apparatus associated with the long-time-opening network feeder circuit breaker is in the provision of suitable contact segments on the contact drum 121, and the omission or shunting of contacts 86 of voltage relay 81. The contact drum 121 associated with a long-time-opening network feeder circuit breaker does not require the contact segments 127 and 131, and the contact segment 129 is so spaced with respect to the contact segments 126 and 128 that only 15 seconds elapse after the energization of the motor 119 due to the opening of the circuit breaker 6—A, before an energizing circuit is completed for the closing coil 88 associated with the circuit breaker 6—A. The shunting of contacts 86 of voltage relay 81 means that the breaker will reclose in 15 seconds irrespective of the energized or deenergized condition of its associated feeder. In all other respects the operation and function of the relay protective apparatus associated with the long-time-opening network feeder circuit breaker is substantially the same as that already described with reference to the short-time-opening network feeder circuit breaker. In view of the repetitive nature of any explanation directed to the function and operation of the relay protective apparatus associated with a long-time-opening network feeder circuit breaker, such detailed explanation is not necessary.

From the foregoing explanation relative to the operation of the protective apparatus of the present invention, it is quite clear that if any fault condition occurs on any network feeder, the circuit breaker at one end of such feeder is actuated to its open position in 0.6 second while the circuit breaker at the other end of the faulty feeder is actuated to its open position 0.5 second later or 1.1 seconds after the occurrence of the fault condition. It is also clear that the long-time opening circuit breaker is reclosed in 15 seconds and, if the fault has not cleared itself, this circuit breaker is again reopened and locked in such open position. Under such conditions, the short-time-opening circuit breaker is actuated to its closed position in 30 seconds after the opening thereof, assuming that the fault condition does not clear itself, with the result that the short-time circuit breaker is again opened in 0.6 second whereupon the protective apparatus associated therewith functions to lock this circuit breaker in its open position.

It should also be noticed that an energizing circuit for the trip coil 89 associated with the circuit breaker 6—A is adapted to be completed when the energizing winding 106 of the relay 104 is effectively energized to bridge the stationary contacts 107 by means of the contact segment 109. Assuming the winding 106 to be effectively energized, the energizing circuit for the trip coil 89 may be traced from the one terminal of the direct-current source 132, through the stationary contacts 107 and contact segment 109 of the relay 104, stationary contacts 96 and pallet switch 92 associated with the circuit breaker 6—A, trip coil 89, and thence to the other terminal of the direct-current source 132. It follows, that the circuit breaker 6—A is adapted to be actuated to its open position substantially instantaneously upon the effective energization of the winding 106 of the relay 104.

The relay 104 and the energizing means for the winding 106 thereof is indicated in Fig. 3 of the drawings and the particular system conditions which effect the energization of the relay 104 will be considered in detail with reference to the schematic diagram of Fig. 3.

In Fig. 3, suitable relay protective means is shown associated with one of the step down transformers feeding the primary network. Inasmuch, as the relay apparatus associated with the circuit breaker on the secondary side of the network transformer is a substantial duplicate for all of the feeder sources, the application of such protective means is only disclosed with reference to one of the network transformers.

For purposes of explanation, the relay protective apparatus associated with the feeder source A, network transformer 16 and circuit breaker 17, as shown in Fig. 1, will be considered. The primary network transformer 16 is shown as being connected to the feeder circuits 6, 7 and 8, and also to the special radial load being supplied from the intersection point through the circuit breaker 40 and the step-down distribution transformer 35.

Referring more particularly to Fig. 3, the network transformer 16 is adapted to supply power to the network feeder circuits 6, 7 and 8 and the special radial load connected to the distribution transformer 35 through the feeder source circuit breaker 17.

The feeder circuits 6, 7 and 8 are indicated as being connected to the common intersection point through the circuit breakers 6—A, 7—A and 8—A, respectively, while the special radial feeder is indicated as being connected to this common intersection point through circuit breaker 40.

It is to be understood that proper relay protective apparatus is associated with each of the circuit breakers 6—A, 7—A, 8—A and 40, and such apparatus may be of the type shown in Fig. 2. As indicated in Fig. 1 of the drawings, the circuit breakers 6—A and 8—A are provided with short-time overload opening relay means, while the circuit breaker 7—A is provided with a long-time overload opening means. The relay opening means associated with circuit breaker 40 may be of any definite time delay, depending upon the particular system application, and is indicated as having a definite time delay of 0.1 second.

Stationary contacts 151 and 152 are associated with the feeder source circuit breaker 17, and a pallet switch 153 is also associated with the circuit breaker 17 and is adapted to bridge the stationary contacts 151 when the circuit breaker 17 is in its closed position, and to bridge the stationary contacts 152 when the circuit breaker 17 has been actuated to its open position. The circuit breaker 17 is provided with a closing coil 154 and a tripping coil 156, the respective energizing circuits for which will be fully described hereinafter.

A directional relay 157 is associated with the circuit breaker 17 and this directional relay is similar to the type of directional relay utilized in the well known low voltage secondary type of network. This relay is provided with a current winding 158, a phasing winding 159, a voltage winding 161, stationary contacts 162, stationary contacts 163, and moving contact 164. The relay 157 is of the induction type and the moving contact 164 is adapted to bridge either the stationary contacts 162 or the stationary contacts 163, depending upon the torque effected by the interaction of the fluxes produced by the current winding 158 and the voltage winding 161, and/or the interaction of the fluxes produced by the phasing winding 159 and the voltage winding 161. The stationary contacts 163 are adapted to be bridged by the moving contact 164 when the relay windings are deenergized, as is usual in this type of relay.

A second induction-type relay 166 is associated with the directional relay 157 and the circuit breaker 17, and this relay is provided with a phasing winding 167, a voltage winding 168, stationary contacts 169 and moving contact 171. The stationary contacts 169 are adapted to be bridged by the moving contact 171 only when the torque effected by the interaction of the fluxes produced by the phasing winding 167 and the voltage winding 168 is in a predetermined direction or when the windings 167 and 168 are deenergized.

A third relay 104 is also associated with the relays 157 and 166, and the circuit breaker 17. This relay 104 is provided with an energizing winding 106, stationary contacts 172, 173, 107, 108, 174, 176, 177, 178, 179 and 181, and contact segments 182, 109, 183, 184 and 186. This relay corresponds to the normally deenergized relay 104 shown in Fig. 2 of the drawings and, in its deenergized condition, the contact segments 182, 109, 183, 184 and 186 are adapted to bridge the stationary contacts 173, 108, 176, 178 and 181, respectively, and, upon the effective energization of the winding 106, the contact segments 182, 109, 183, 184 and 186 are adapted to bridge the stationary contacts 172, 107, 174, 177 and 179, respectively.

One secondary terminal of the network transformer 16 is grounded at 187, and step-down potential transformers 188 and 189 are connected across the secondary terminals of the network transformer 16 on the transformer and network feeder sides of the circuit breaker 17, respectively. Inasmuch as one secondary terminal of the network transformer 16 is grounded at 187, the corresponding secondary terminals of the step-down potential transformers 188 and 189 are also shown as grounded, in order to simplify the wiring circuits for the relay protective apparatus.

The remaining secondary terminal of the potential transformer 188 is connected to one terminal of the phasing winding 159 of the directional relay 157, and the other terminal of the phasing winding 159 is connected to the remaining secondary terminal of the potential transformer 189, thus effecting the energization of the phasing winding 159 in accordance with the voltage across the break-contacts of the circuit breaker 17 when this circuit breaker is in its open position. One terminal of the phasing winding 167 of the relay 166 is also connected to the remaining secondary terminal of the voltage transformer 188 and the other terminal of the phasing winding 167 is connected to the remaining secondary terminal of the potential transformer 189. Obviously, the phasing winding 167 is also energized in accordance with the voltage on both sides of the break-contacts of the circuit breaker 17 when the circuit breaker is in its open position.

A current transformer 191 is associated with one secondary terminal of the network transformer 16, the primary winding 192 thereof being indicated as the secondary lead of the network transformer 16 on the line side of the circuit breaker 17. One terminal of the secondary winding 193 is connected to one terminal of the current winding 158 of the directional relay 157, and the remaining terminal of the current winding 158 is connected to the remaining secondary terminal of the current transformer 191 through a group of parallel circuits, said parallel circuits comprising current transformer 51 and current winding 54 of the current-responsive relay 56, current transformer 194 and current winding 196 of the current-responsive relay 197, current transformer 198 and current winding 199 of the current-responsive relay 201, and current transformer 202 and current winding 203 of the current-responsive relay 204, respectively.

The current transformer 51 and the current-responsive relay 56, associated with the network feeder 6 and the circuit breaker 6—A, correspond to the current transformer 51 and the current-responsive relay 56 shown in Fig. 2 of the drawings. Only the energizing winding 54 of the current-responsive relay 56 is shown in Fig. 3, inasmuch as it is not deemed necessary or advisable to complicate the wiring connections illustrated in Fig. 3 since the relay protective apparatus associated with the circuit breaker 6—A has already been considered in detail.

The current transformers and current-responsive relays 194 and 197, 198 and 201, 202 and 204, are associated with the respective network feeders 7 and 8, and the special radial feeder supplying power to the distribution transformer 35, respectively.

With the above scheme of circuit connections, the current winding 158 of the directional relay 157 is energized in accordance with the current flowing in the secondary winding 193 of the current transformer 191. The current winding 158 is, therefore, energized in accordance with the current flowing through the closed contacts of the circuit breaker 17 only when this circuit breaker is in its closed position. It will also be noted that the current transformers 51, 194, 198 and 202 associated with the respective network feeders 6, 7 and 8 and the special radial feeder supplying power to the distribution transformer 35, respectively, are paralleled beyond the points at which the current responsive relays 56, 197, 201 and 204, respectively, are included in the respective parallel circuits.

The energizing winding 106 of the relay 104 is connected in parallel with the respective parallel circuits comprising the current transformer 191 and the current winding 158 of the directional relay 157, current transformer 51 and current winding 54 of the current-responsive relay 56, current transformer 194 and current winding 196 of the current-responsive relay 197, current transformer 198 and current winding 199 of the current-responsive relay 201, and current transformer 202 and current winding 203 of the current-responsive relay 204, respectively.

Assuming that power is being supplied to the connection point of the network feeders 6, 7 and 8 and the special radial load supplying the distribution transformer 35, it is obvious that the sum of all of the currents flowing to this connection point is equal to the sum of all of the currents flowing away from the connection point. Therefore, irrespective of the direction of power flow in the respective feeders 6, 7 and 8 or in the network transformer 16, the currents induced in the secondary windings of the current transformers 191, 51, 194, 198 and 202 circulate between these respective windings, and no current flows through the energizing winding 106 of the relay 104. This condition also exists when a fault occurs on any of the feeder circuits 6, 7 or 8, the radial load circuit supplying the distribution transformer 35, and in the network transformer 16 or in its primary circuit to source A, providing such fault does not occur between the respective current transformers, associated with the above circuits, and the common intersection point.

However, in the event of a fault at the intersection point, as at 206, the balance is destroyed between the parallel circuits including the secondary windings of the current transformers 191, 51, 194, 198 and 202, with the result that the energizing winding 106 of the relay 104 is effectively energized. It follows, therefore, that the relay 104 is normally deenergized and is only actuated in the event of a fault at the common connection point.

Assume the network feeders 6, 7 and 8 to be deenergized, their respective circuit breakers 6—A, 7—A and 8—A to be opened, the circuit breaker 40 to be opened, the circuit breaker 17 to be in its open position, and also that the network transformer 16 is deenergized. As a result of the energization of the primary winding of the network transformer 16, the following sequence of relay operation results.

The potential transformer 188 is energized immediately upon the energization of the distribution transformer 16, but since the potential transformer 189 is not energized, due to the circuit breaker 17 being in its open position, the phasing and voltage windings of the relays 157 and 166 are slightly energized with the result that there is only a small electrical torque produced tending to actuate their respective moving contacts 164 and 171, respectively. Under such conditions, the moving contact 164 of the directional relay 157 is adapted to bridge the stationary contacts 163 by means of this electrical torque and any suitable biasing means (not shown). The moving contact 171 of the relay 166 is also adapted to bridge the stationary contacts 169 under such conditions by the small electrical torque and any suitable biasing means.

Upon the energization of the distribution transformer 16 and the consequent energization of the potential transformer 188, an energizing circuit is completed for the closing coil 154 associated with the circuit breaker 17. This energizing circuit may be traced from one secondary terminal of the potential transformer 188, through stationary contacts 173 and contact segment 182 of the normally deenergized relay 104, stationary contacts 169 and moving contact 171 of the relay 166, stationary contacts 163 and moving contact 164 of the directional relay 157, stationary contacts 152 and pallet switch 153 associated with the open circuit breaker 17, closing coil 154 and thence to ground.

The circuit breaker 17 is thereby actuated to its closed position and power is supplied from the network transformer 16 through the circuit breaker 17 to the connection point of feeders 6, 7 and 8 and the special radial feeder supplying the distribution transformer 35. The current transformer 191 and the potential transformer 189 are now energized with the result that the current winding 158 of the directional relay 157 is energized in accordance with the current flowing through the closed contacts of the circuit breaker 17, and the voltage windings 161 and 168 of the respective relays 157 and 166 are energized in accordance with the voltage across the secondary winding of the potential transformer 189.

The closing of circuit breaker 17 provides voltage at the connection point of the network feeders 6, 7 and 8 and the special radial feeder including the distribution transformer 35. As explained hereinbefore, the network feeder breakers 6—A, 7—A and 8—A are actuated to their closed positions due to the presence of potential on one side thereof. The remaining network feeder breakers are thereafter automatically closed due to the energization of the network.

Next, assuming that the circuit breaker 17 is in its closed position and the network transformer 16 is supplying power to the network feeders and the radial feeder, and that one or more of the network feeders 6, 7 and/or 8 is energized at the other end thereof from a source other than the source A supplying the distribution transformer 16, it is possible that the flow of energy or power may be reversed in the secondary circuit of the network transformer 16.

This condition may exist when a fault condition occurs either in the network transformer 16 itself or on the source side thereof. Assuming some such fault to exist, the flow of current in the current transformer 191 will be reversed with the result that the torque effected by the interaction of the fluxes produced by the current winding 158 and the voltage winding 161 of the directional relay 157 will be in a direction to effect the bridging of the stationary contacts 162 by means of the moving contact 164, with the result that an energizing circuit is completed for the trip coil 156 associated with the circuit breaker 17. This energizing circuit may be traced from one terminal of a direct-current source, such as battery 207, through the stationary contacts 162 and moving contact 164 of the directional relay 157, trip coil 156, stationary contacts 151 and pallet switch 153 associated with the circuit breaker 17, and thence to the other terminal of the direct-current source 207.

The circuit breaker 17 is thereby actuated to its open position and the network transformer 16 is effectively isolated from the common connection point of the network feeders 6, 7 and 8 and the special radial feeder supplying the distribution transformer 35. Since it is desirable to open the circuit breaker 17 before the overcurrent resulting from the fault condition has persisted a sufficient time to result in the opening of any of the feeder circuit breakers, the relay 157 may be so designed and adjusted to bridge contacts 162 by the moving contact 164 and thereby effectively energize the tripping coil 156 before the duration of 0.6 second. As shown in the drawings, this tripping time has been indicated as 0.1 second. Obviously, if the feeder circuit breaker operation is not disadvantageous, this tripping time may be made longer. Under such system conditions the stationary contacts 163 and 169 of the respective relays 157 and 166 may be bridged by the moving contacts 164 and 171, respectively. However, since the potential transformer 188 is deenergized, there is no voltage available for effecting the energization of the closing coil 154 associated with the circuit breaker 17, and the circuit breaker 17 is maintained in its open position.

The directional relay 157 may also be so designed and adjusted that the stationary contacts 162 thereof are adapted to be bridged by the moving contact 164 in the event of a reverse flow of current through the current transformer 191 commensurate with the magnetizing current which may be supplied to the secondary winding of the distribution transformer 16. In this manner, assuming the circuit breaker 17 to be in its closed position, the deenergization of the primary winding of the network transformer 16 results in the flow of current from the connection point of the network feeders 6, 7 and 8 and the special radial feeder, through the circuit breaker 17, and to the secondary winding of the network transformer 16. This magnetizing current effects the actuation of the directional relay 157 to effect the opening of the circuit breaker 17 in the manner described hereinbefore.

Next, assuming that the common connection point is energized from one or more of the network feeders 6, 7 and/or 8, that the circuit breaker 17 is in its open position, and that it is desired to connect the source A to supply power to the common connection point through the network thransformer 16, the following sequence of relay operation occurs.

The phasing windings 159 and 167 of the respective relays 157 and 166 are now connected in parallel and energized in accordance with the voltages on both sides of the break-contacts of the open circuit breaker 17, such energization being effected by means of the potential transformers 188 and 189. The voltage windings 161 and 168 of the relays 157 and 166, respectively, are energized in accordance with the secondary voltage of the potential transformer 189.

The characteristics of the directional relay 157 are so chosen that the interaction of the fluxes produced by the phasing winding 159 and the voltage winding 161 effect a torque acting to bridge the stationary contacts 163 by means of the moving contact 164 when the energizing voltage of the phasing winding 159 does not lead or lag the energizing voltage of the voltage winding 161 by more than 90 degrees. However, the characteristics of the relay 166 are so chosen that the stationary contacts 169 thereof are only bridged by the moving contact 171 when the energizing voltage of the phasing winding 167 leads the energizing voltage of the voltage winding 168 by not more than substantially 180 degrees or does not lag this voltage by more than a few degrees.

In this manner, both of the stationary contacts 163 and 169 of the respective relays 157 and 166 are only bridged by the moving contacts 164 and 171, respectively, when the energizing voltage of the respective phasing windings 159 and 167 does not lead the energizing voltage of the respective voltage windings 161 and 168 by more than 90 degrees, or does not lag this voltage by more than a few degrees. Obviously, the closing range of the relay 166 may be so chosen as to permit of the bridging of the stationary contacts 163 and 169 by the respective moving contacts 164 and 171 during any predetermined phase relation existing between the voltage across the break contacts of the open circuit breaker 17 and the secondary voltage of the potential transformer 189, such closing range depending upon the particular characteristics desired.

In this manner, the possibility of "pumping" or the repeated consecutive actuation of the circuit breaker 17, is avoided, and this breaker is only actuated to its closed position when the current which flows through the circuit breaker after it closes is of such magnitude and phase position as to maintain it in the closed position.

It has been noted hereinbefore that the winding 106 of the relay 104 is only effectively energized upon the occurrence of a fault at the common connection point of the network transformer feeder, the network feeders 6, 7 and 8 and the special radial feeder supplying power to the distribution transformer 35. It has also been pointed out that the circuit breakers 7—A, 8—A and 40 may be controlled in a manner similar to the control of the circuit breaker 6—A, as shown in Fig. 2, and it is also apparent that the circuit breakers 7—A, 8—A and 40 are actuated to their open positions upon the effective energization of the winding 106 of relay 104, as described with reference to Fig. 2 of the drawings.

As explained with reference to Fig. 2, the stationary contacts 107 and 108 and the contact segment 109 of the relay 104 are associated with the control circuit for the circuit breaker 6—A. In a similar manner (not shown) the stationary contacts 174 and 176 and the contact segment 183, the stationary contacts 177 and 178 and the contact segment 184, and the stationary contacts 179 and 181 and the contact segment 186, of the relay 104, are adapted to be associated with the control circuits for the circuit breakers 7—A, 8—A and 40, respectively.

Upon the occurrence of the fault 206, the winding 106 of the relay 104 is effectively energized and the stationary contacts 172, 107, 174, 177 and 179 are bridged by the contact segments 182, 109, 183, 184 and 186, respectively. The bridging of the stationary contacts 172 by the contact segment 182 completes an energizing circuit for the trip coil 156 of the circuit breaker 17. This energizing circuit may be traced from one terminal of the direct-current source 207, through the stationary contacts 172 and contact segment 182 of the relay 104, trip coil 156, stationary contacts 151 and pallet switch 153 associated with the circuit breaker 17, and thence to the other terminal of the direct-current source 207.

The circuit breaker 17 is thereby actuated to its open position upon the occurrence of a fault at the connection point, as fault 206, and the circuit breakers 6—A, 7—A, 8—A and 40 are also actuated to their respective open positions, the energizing circuits of which have already been treated with reference to Fig. 2 of the drawings.

It will be observed that no attempt is made to close any of the circuit breakers associated with a connection point after the fault has resulted in the opening of such circuit breakers. In order to insure that no such reclosure is attempted, the relay 104 is provided with a latching means 208 which operates to lock the relay 104 in its energized position and open all of the possible energizing circuits for the closing coils of the respective circuit breakers.

From the foregoing description of the application and operation of the present invention, as illustrated in the several drawings, it is clear that a medium voltage primary net work offers many advantages in the proper distribution of power and it is also apparent that the proposed protective scheme offers complete and satisfactory protection under any system conditions and also that no limitations are placed on the design or extension of such primary network systems of distribution.

In view of the distinctly novel features of the present invention and the many advantages which accrue in the application thereof to systems of alternating current distribution, the present invention is not to be limited other than as required by the prior art and as indicated in the appended claims.

I claim as my invention:

1. In a distribution system of the network type, a plurality of network feeders arranged and connected to form a closed mesh, a pair of circuit breakers for each of said feeders for controlling the connection of the corresponding feeder and the adjacent intersections of said mesh, means for supplying power to each intersection of said mesh, opening means for each of said circuit breakers, each of said opening means including a fault responsive relay operable with definite time delay, said relays for an alternate series of circuit breakers around said mesh being operable with comparatively short definite time delay in response to fault conditions on said mesh, and said relays for the remaining alternate series of said circuit breakers around said mesh being operable with comparatively long definite time delay in response to fault conditions on said mesh, whereby in response to a fault on any of said feeders, the faulted feeder is disconnected at both ends but each unfaulted feeder remains connected to one of said means for supplying power.

2. In a distribution system of the network type, a plurality of network feeders arranged and connected to form a closed mesh, a pair of circuit breakers for each of said feeders for controlling the connection of the corresponding feeder and the adjacent intersections of said mesh, opening means for each of said circuit breakers, each of said opening means including an overcurrent relay operable with definite minimum time delay, said relays for an alternate series of circuit breakers around said mesh being operable with comparatively short definite time delay in response to fault conditions on said mesh and said relays for the remaining alternate series of circuit breakers around said mesh being operable with comparatively long definite time delay in response to fault conditions on said mesh.

3. In a distribution system of the network type, a plurality of network feeders arranged and connected to form a closed mesh, a pair of circuit breakers for each of said feeders for controlling the connection of the corresponding feeder and the adjacent intersections of said mesh, opening means for each of said circuit breakers, each of said opening means including a fault responsive relay operable with definite time delay and undervoltage opening means operable in response to de-energization of both the corresponding network feeder and the adjacent intersection of said mesh, said relays for an alternate series of circuit breakers around said mesh being operable with comparatively short definite time delay in response to fault conditions on said mesh and said relays for the remaining alternate series of circuit breakers around said mesh being operable with comparatively long definite time delay in response to faults on said mesh, whereby in response to a fault on any of said feeders when all or all but one of said power supply means are effective, both of said circuit breakers for the faulted feeder are opened and at least one of said circuit breakers for an unfaulted feeder remains closed.

4. In a distribution system of the network type, a plurality of network feeders arranged and connected to form a closed mesh, a pair of circuit breakers for each of said feeders for controlling the connection of the corresponding feeder and the adjacent intersections of said mesh, means for supplying power to each intersection of said mesh, opening means for each of said circuit breakers, each of said opening means including a fault-responsive relay operable with definite time delay, said relays for a first alternate series of circuit breakers around said mesh being operable with comparatively short definite time delay in response to fault conditions on said mesh and said relays for a second alternate series of circuit breakers around said mesh being operable with comparatively long definite time delay in response to fault conditions on said mesh, reclosing means for each circuit breaker of said second alternate series for effecting at least one reclosure of the corresponding circuit breaker within a predetermined time interval after opening thereof, and reclosing means for each circuit breaker of said first alternate series for effecting at least one reclosure of the corresponding circuit breaker at the expiration of a time delay different from said predetermined time interval after opening thereof.

5. In a distribution system of the network type, a plurality of network feeders arranged and connected to form a closed mesh, a transformer for supplying power to each intersection of said mesh, a transformer circuit breaker for controlling the connection of each of said transformers to the corresponding intersection of said mesh, a pair of network circuit breakers for each of said network feeders for controlling the connection of the corresponding network feeder and the adjacent intersections of said mesh, opening means for each of said network circuit breakers, each of said opening means including a fault responsive relay operable with definite minimum time delay of at least a predetermined value in response to fault conditions on said mesh, and directionally-responsive opening means for each of said transformer circuit breakers, said directionally-responsive opening means being operable in a time interval less than said predetermined value in response to faults on the source side of the corresponding transformer circuit breaker.

6. In a distribution system of the network type, a plurality of network feeders arranged and connected to form a closed mesh, a transformer for supplying power to each intersection of said mesh, a transformer circuit breaker for controlling the connection of each of said transformers to the corresponding intersection of said mesh, a pair of network circuit breakers for each of said network feeders for controlling the connection of the corresponding network feeder and the adjacent intersections of said mesh, opening means for each of said network circuit breakers, each of said opening means including a fault-responsive relay operable with definite minimum time delay, said relays for an alternate series of network circuit breakers around said mesh being operable with definite time delay of substantially a predetermined value in response to fault conditions on said mesh and said relays for the remaining alternate series of network circuit breakers around said mesh being operable with definite time delay greater than said predetermined value in response to fault conditions on said mesh, and directionally-responsive opening means for each of said transformer circuit breakers, each of said directionally-responsive opening means including directional relay means operable in a time interval less than said predetermined value in response to fault conditions on the source side of the corresponding transformer circuit breaker.

7. In a distribution system of the network type, a plurality of network feeders arranged and connected to form a closed mesh, a first circuit breaker and a second circuit breaker for each of said feeders for controlling the connection of the corresponding feeder and the adjacent intersections of said mesh, power supply means for a plurality of intersections of said mesh, opening means for each of said circuit breakers, each of said opening means including a fault responsive relay, said opening means for said first circuit breaker for each of said feeders being operable to cause the corresponding circuit breaker to open in advance of said second circuit breaker for the corresponding feeder, and reclosing means for each of said circuit breakers, said reclosing means for said second circuit breaker for each of said feeders being operable to cause the corresponding circuit breaker to reclose in advance of said first circuit breaker for the corresponding feeder, whereby in response to a fault on any of said feeders, the circuit breakers for the faulted feeder are opened in a predetermined sequence and reclosed in the reverse sequence.

8. In a distribution system of the network type, a plurality of network feeders arranged and connected to form a closed mesh, a pair of circuit breakers for each of said feeders for controlling the connection of the corresponding feeder and the adjacent intersection of said mesh, said circuit breakers comprising a first alternate series and a second alternate series around said mesh, power supply means for a plurality of intersections of said mesh, opening means for each of said circuit breakers, each of said opening means including a fault responsive relay, said opening means for the first alternate series circuit breaker for each of said feeders being operable to cause the corresponding circuit breaker to open in advance of the second alternate series circuit breaker for the corresponding feeder, and reclosing means for each of said circuit breakers, said reclosing means for the second alternate series circuit breaker for each of said feeders being operable to cause the corresponding circuit breaker to reclose in advance of the first alternate series circuit breaker for the corresponding feeder, whereby in response to a fault on any of said feeders, the circuit breakers for the faulted feeder are opened in a predetermined sequence and reclosed in the reverse sequence.

9. In a primary network unit, a transformer having a secondary circuit, a network feeder circuit, a network circuit breaker for controlling the connection of said secondary circuit and said feeder circuit, said circuit breaker having a trip coil and an electromagnetic closing element, an auxiliary source independent of said circuits, means responsive to voltage failure of said secondary circuit and said feeder circuit for connecting said trip coil to said auxiliary source to cause said circuit breaker to open, means effective upon restoration of voltage of said secondary circuit for causing said closing element to be energized after a predetermined time delay, and means effective upon restoration of voltage of said feeder circuit for causing said closing element to be energized after a predetermined different time delay.

10. In a primary network unit, a transformer having a secondary circuit, a network feeder circuit, a network circuit breaker for controlling the connection of said secondary circuit and said feeder circuit, opening means for said circuit breaker including a fault responsive relay, reclosing means for said circuit breaker for causing said circuit breaker to reclose at least once with a predetermined time delay after opening thereof and to lock out in response to a non-clearing fault, and means responsive to the voltage of said feeder circuit for modifying the operation of said reclosing means to cause said circuit breaker to reclose at least once with shorter time delay and to lock out in response to a non-clearing fault within a time interval less than said predetermined time delay when said feeder circuit is de-energized.

11. In a distribution system of the network type, a plurality of network feeders arranged and connected to form a closed mesh, a circuit breaker included in each of said feeders, power supply means for a plurality of intersections of said mesh, opening means for each of said circuit breakers, each of said opening means including a fault responsive relay, reclosing means for each of said circuit breakers, each of said reclosing means being effective to cause the corresponding circuit breaker to reclose at least once after a time delay of predetermined value after opening thereof when the corresponding feeder is energized, and voltage responsive means for modifying the operation of said reclosing means to cause any of said circuit breakers to reclose at least once after a comparatively short time interval and to lock out in response to a non-clearing fault within a time interval less than said predetermined value when the corresponding feeder is de-energized, whereby following a non-clearing fault on said mesh, any of said circuit breakers which re-establish a power path to the fault upon reclosure are locked out before reclosure of others of said circuit breakers which may have opened in response to the fault.

12. In a distribution system of the network type, a plurality of network feeders arranged and connected to form a closed mesh, a pair of circuit breakers for each of said feeders for controlling the connection of the corresponding feeder and the adjacent intersections of said mesh, said circuit breakers comprising a first alternate series and a second alternate series around said mesh, power supply means for a plurality of intersections of said mesh, protective means including fault responsive relays for controlling said circuit breakers, said protective means being effective in response to a fault on any of said feeders to cause both of said circuit breakers for the faulted feeder to open, and to cause other circuit breakers of said first alternate series to open, reclosing means for each circuit breaker of said first alternate series for causing the corresponding circuit breaker to reclose at least once after a time interval of at least a predetermined long value after opening thereof, voltage-responsive means for modifying the operation of said reclosing means to cause any circuit breaker of said first series to reclose at least once when the corresponding feeder is deenergized with time delay of moderate value and to lock out in a time interval less than said predetermined long value in response to a non-clearing fault, and lock out reclosing means for each circuit breaker of said second alternate series for causing the corresponding circuit breaker to reclose at least once after a time delay different from said moderate value and to lock out in response to a non-clearing fault in a time interval less than said predetermined long value.

13. In a distribution system of the network type, a plurality of network feeders arranged and connected to form a closed mesh, a pair of circuit breakers for each of said feeders for controlling the connection of the corresponding feeder and the adjacent intersections of said mesh, said circuit breakers comprising a first alternate series and a second alternate series around said mesh, power supply means for a plurality of intersections of said mesh, protective means including fault responsive relays for controlling said circuit breakers, said protective means being effective in response to a fault on any of said feeders to cause both of said circuit breakers for the faulted feeder to open, and to cause other circuit breakers of said first alternate series to open, reclosing means for each circuit breaker of said first alternate series for causing the corresponding circuit breaker to reclose at least once after a time interval of predetermined long value after opening thereof, voltage responsive means for modifying the operation of said reclosing means to cause any circuit breaker of said first alternate series to reclose at least once when the corresponding feeder is deenergized with time delay of moderate value and to lockout in a time interval less than said predetermined long value in response to a non-clearing fault, and lockout reclosing means for each circuit breaker of said second alternate series for causing the corresponding circuit breaker to reclose at least once after a short time delay and to lock out in response to a non-clearing fault in a time interval less than said moderate value.

14. In a distribution system of the network type, a plurality of network feeders arranged and connected to form a closed mesh, a pair of circuit breakers for each of said feeders for controlling the connection of the corresponding feeder and the adjacent intersections of said mesh, said circuit breakers comprising a first alternate series and a second alternate series around said mesh, power supply means for a plurality of intersections of said mesh, opening means for each of said circuit breakers, each of said opening means including a fault responsive relay operable with definite minimum time delay, said relays for the circuit breakers of said first alternate series being operable with comparatively short definite time delay in response to fault conditions on said mesh and said relays for the circuit breakers of said second alternate series being operable with comparatively long time delay in response to fault conditions on said mesh, reclosing means for each circuit breaker of said first alternate series for causing the corresponding circuit breaker to reclose at least once after a time interval of predetermined long value after opening thereof, voltage responsive means for modifying the operation of said reclosing means to cause any circuit breaker of said first alternate series to reclose at least once when the corresponding feeder is deenergized with time delay of moderate value and to lock out in a time interval less than said predetermined long value in response to a non-clearing fault, and lock-out reclosing means for each circuit breaker of said second alternate series for causing the corresponding circuit breaker to reclose at least once after a time delay different from said moderate value and to lock out in response to a non-clearing fault in a time interval less than said predetermined long value.

15. In a primary network unit, a transformer having a secondary circuit, a plurality of network feeder circuits, an intersection bus, a plurality of network circuit breakers for controlling the connection of said network circuits and said bus, a transformer circuit breaker for controlling the connection of said secondary circuit and said bus, means responsive to a fault on the source side of said transformer circuit breaker for causing said transformer circuit breaker to open, control means for said network circuit breakers including relay means operable in response to abnormal conditions of said feeder circuits, and means responsive to a fault on said bus for causing said transformer circuit breaker and all of said feeder circuit breakers to open, whereby when said circuit breakers are closed and a fault occurs on the source side of said transformer circuit breaker, said feeder circuits remain connected through said bus and upon the occurrence of a fault on said bus, said bus is entirely disconnected.

16. In a network unit for use in a distribution system having a plurality of network feeders arranged and connected to form a closed mesh, an intersection bus, a transformer for supplying power to said bus, a transformer circuit breaker for controlling the connection of said transformer and said bus, a plurality of network circuit breakers for controlling the connection of the adjacent network feeders and said bus, opening means for each of said network circuit breakers, each of said opening means including a fault responsive relay operable with definite minimum time delay of at least a predetermined value in response to fault connections on said mesh, directionally responsive opening means for said transformer circuit breaker, said directionally responsive opening means being operable in a time interval less than said predetermined value in response to faults on the source side of said transformer circuit breaker, and means responsive to a fault on said bus for causing said transformer circuit breaker and said network circuit breakers to open.

JOHN S. PARSONS.